(12) United States Patent
Jiang et al.

(10) Patent No.: US 8,390,580 B2
(45) Date of Patent: Mar. 5, 2013

(54) TOUCH PANEL, LIQUID CRYSTAL DISPLAY SCREEN USING THE SAME, AND METHODS FOR MAKING THE TOUCH PANEL AND THE LIQUID CRYSTAL DISPLAY SCREEN

(75) Inventors: Kai-Li Jiang, Beijing (CN); Liang Liu, Beijing (CN); Shou-Shan Fan, Beijing (CN); Ga-Lane Chen, Santa-Clara, CA (US); Jia-Shyong Cheng, Tu-Cheng (TW); Jeah-Sheng Wu, Tu-Cheng (TW)

(73) Assignees: Tsinghua University, Beijing (CN); Hon Hai Precision Industry Co., Ltd., New Taipei (TW)

( * ) Notice: Subject to any disclaimer, the term of this patent is extended or adjusted under 35 U.S.C. 154(b) by 585 days.

(21) Appl. No.: 12/459,545

(22) Filed: Jul. 2, 2009

(65) Prior Publication Data
US 2010/0007619 A1    Jan. 14, 2010

(30) Foreign Application Priority Data

Jul. 9, 2008  (CN) .......................... 2008 1 0068370
Jul. 9, 2008  (CN) .......................... 2008 1 0068372
Jul. 9, 2008  (CN) .......................... 2008 1 0068373

(51) Int. Cl.
*G06F 3/041*    (2006.01)
(52) U.S. Cl. ........ 345/173; 345/174; 345/175; 977/842; 977/952
(58) Field of Classification Search .......... 345/173–175; 977/842, 952
See application file for complete search history.

(56) References Cited

U.S. PATENT DOCUMENTS

| | | | |
|---|---|---|---|
| 4,659,873 A | 4/1987 | Gibson et al. | |
| 4,922,061 A | 5/1990 | Meadows et al. | |
| 4,933,660 A | 6/1990 | Wynne, Jr. | |
| 5,181,030 A | 1/1993 | Itaya et al. | |
| 5,853,877 A | 12/1998 | Shibuta | |
| 5,861,583 A | 1/1999 | Schediwy et al. | |

(Continued)

FOREIGN PATENT DOCUMENTS

| CN | 2539375 | 3/2003 |
|---|---|---|
| CN | 1447279 | 10/2003 |

(Continued)

OTHER PUBLICATIONS

Yoshikazu Nakayama, "Technology Development of CNT Long Yarns and CNT Sheets", Nano Carbon Handbook, Japan TSN Inc, pp. 261-266, Jul. 17, 2007(the First 6 Sentences of 2nd, 3rd,4th Paragraphs and the first 3 sentences of 5th paragraph on p. 262,the 4th paragraph on p. 264 and the 5th sentence of 3rd paragraph on p. 265 may be relevant).

(Continued)

*Primary Examiner* — Bipin Shalwala
*Assistant Examiner* — Afroza Chowdhury
(74) *Attorney, Agent, or Firm* — Altis Law Group, Inc.

(57) ABSTRACT

A liquid crystal display screen includes an upper board, a lower board opposite to the upper board, and a liquid crystal layer located between the upper board and the lower board. The upper board includes a touch panel. The touch panel includes an amount of transparent electrodes. At least one of the transparent electrodes includes a transparent carbon nanotube structure. The lower board includes a thin film transistor panel. The thin film transistor panel includes an amount of thin film transistors. Each of the thin film transistors includes a semiconducting layer. The semiconducting layer includes a semiconducting carbon nanotube structure.

21 Claims, 14 Drawing Sheets

U.S. PATENT DOCUMENTS

| | | | |
|---|---|---|---|
| 5,931,764 A | 8/1999 | Freeman et al. | |
| 6,373,472 B1 | 4/2002 | Palalau et al. | |
| 6,423,583 B1 | 7/2002 | Avouris et al. | |
| 6,531,828 B2* | 3/2003 | Yaniv et al. | 315/169.3 |
| 6,628,269 B2 | 9/2003 | Shimizu | |
| 6,629,833 B1 | 10/2003 | Ohya et al. | |
| 6,914,640 B2 | 7/2005 | Yu | |
| 6,947,203 B2 | 9/2005 | Kanbe | |
| 7,054,064 B2 | 5/2006 | Jiang et al. | |
| 7,060,241 B2 | 6/2006 | Glatkowski | |
| 7,071,927 B2 | 7/2006 | Blanchard | |
| 7,084,933 B2 | 8/2006 | Oh et al. | |
| 7,196,463 B2 | 3/2007 | Okai et al. | |
| 7,215,329 B2 | 5/2007 | Yoshikawa et al. | |
| 7,242,136 B2 | 7/2007 | Kim et al. | |
| 7,336,261 B2 | 2/2008 | Yu | |
| 7,348,966 B2* | 3/2008 | Hong et al. | 345/173 |
| 7,355,592 B2 | 4/2008 | Hong et al. | |
| 7,399,400 B2 | 7/2008 | Soundarrajan et al. | |
| 7,532,182 B2 | 5/2009 | Tseng et al. | |
| 7,537,975 B2 | 5/2009 | Moon et al. | |
| 7,593,004 B2* | 9/2009 | Spath et al. | 345/174 |
| 7,630,040 B2 | 12/2009 | Liu et al. | |
| 7,645,400 B2* | 1/2010 | Saitoh | 252/511 |
| 7,662,732 B2 | 2/2010 | Choi et al. | |
| 7,663,607 B2 | 2/2010 | Hotelling et al. | |
| 7,704,480 B2 | 4/2010 | Jiang et al. | |
| 7,710,649 B2 | 5/2010 | Feng et al. | |
| 7,796,123 B1 | 9/2010 | Irvin, Jr. et al. | |
| 7,825,911 B2 | 11/2010 | Sano et al. | |
| 7,854,992 B2 | 12/2010 | Fu et al. | |
| 7,947,977 B2* | 5/2011 | Jiang et al. | 257/40 |
| 8,080,929 B2* | 12/2011 | Jeng et al. | 313/311 |
| 8,199,119 B2* | 6/2012 | Jiang et al. | 345/173 |
| 8,260,378 B2* | 9/2012 | Jiang et al. | 455/575.1 |
| 2002/0089492 A1 | 7/2002 | Ahn et al. | |
| 2003/0122800 A1 | 7/2003 | Yu | |
| 2003/0133865 A1* | 7/2003 | Smalley et al. | 423/447.1 |
| 2003/0147041 A1 | 8/2003 | Oh et al. | |
| 2003/0170166 A1* | 9/2003 | Smalley et al. | 423/447.1 |
| 2003/0189235 A1 | 10/2003 | Watanabe et al. | |
| 2004/0047038 A1 | 3/2004 | Jiang et al. | |
| 2004/0053780 A1 | 3/2004 | Jiang et al. | |
| 2004/0099438 A1 | 5/2004 | Arthur et al. | |
| 2004/0105040 A1 | 6/2004 | Oh et al. | |
| 2004/0136896 A1 | 7/2004 | Liu et al. | |
| 2004/0191157 A1 | 9/2004 | Harutyunyan et al. | |
| 2004/0251504 A1* | 12/2004 | Noda | 257/369 |
| 2005/0110720 A1 | 5/2005 | Akimoto et al. | |
| 2005/0151195 A1 | 7/2005 | Kavase et al. | |
| 2005/0209392 A1 | 9/2005 | Luo et al. | |
| 2006/0010996 A1 | 1/2006 | Jordan et al. | |
| 2006/0022221 A1 | 2/2006 | Furukawa et al. | |
| 2006/0044284 A1 | 3/2006 | Tanabe | |
| 2006/0061704 A1 | 3/2006 | Hayano et al. | |
| 2006/0077147 A1 | 4/2006 | Palmateer et al. | |
| 2006/0097991 A1 | 5/2006 | Hotelling et al. | |
| 2006/0171032 A1 | 8/2006 | Nishioka | |
| 2006/0187213 A1 | 8/2006 | Su | |
| 2006/0187369 A1 | 8/2006 | Chang | |
| 2006/0188721 A1* | 8/2006 | Irvin et al. | 428/402 |
| 2006/0188723 A1* | 8/2006 | Rowley et al. | 428/408 |
| 2006/0213251 A1 | 9/2006 | Rinzler et al. | |
| 2006/0240605 A1 | 10/2006 | Moon et al. | |
| 2006/0262055 A1 | 11/2006 | Takahara | |
| 2006/0263588 A1 | 11/2006 | Handa et al. | |
| 2006/0274047 A1 | 12/2006 | Spath et al. | |
| 2006/0274048 A1* | 12/2006 | Spath et al. | 345/173 |
| 2006/0274049 A1 | 12/2006 | Spath et al. | |
| 2006/0275956 A1 | 12/2006 | Konesky | |
| 2006/0278444 A1 | 12/2006 | Binstead | |
| 2007/0065651 A1 | 3/2007 | Glatkowski et al. | |
| 2007/0069212 A1 | 3/2007 | Saitoh et al. | |
| 2007/0075619 A1 | 4/2007 | Jiang et al. | |
| 2007/0081681 A1 | 4/2007 | Yu et al. | |
| 2007/0085838 A1 | 4/2007 | Ricks et al. | |
| 2007/0099333 A1 | 5/2007 | Moriya | |
| 2007/0132953 A1 | 6/2007 | Silverstein | |
| 2007/0153362 A1* | 7/2007 | Gruner | 359/315 |
| 2007/0153363 A1* | 7/2007 | Gruner | 359/315 |
| 2007/0165004 A1 | 7/2007 | Seelhammer et al. | |
| 2007/0182720 A1 | 8/2007 | Fujii et al. | |
| 2007/0215841 A1* | 9/2007 | Ford et al. | 252/503 |
| 2007/0257894 A1 | 11/2007 | Philipp | |
| 2007/0262687 A1 | 11/2007 | Li | |
| 2007/0273796 A1 | 11/2007 | Silverstein et al. | |
| 2007/0273797 A1 | 11/2007 | Silverstein et al. | |
| 2007/0273798 A1 | 11/2007 | Silverstein et al. | |
| 2007/0279556 A1 | 12/2007 | Wang et al. | |
| 2007/0290253 A1* | 12/2007 | Kito et al. | 257/315 |
| 2007/0296897 A1* | 12/2007 | Liu et al. | 349/123 |
| 2007/0298253 A1* | 12/2007 | Hata et al. | 428/339 |
| 2008/0007535 A1 | 1/2008 | Li | |
| 2008/0029292 A1 | 2/2008 | Takayama et al. | |
| 2008/0048996 A1 | 2/2008 | Hu et al. | |
| 2008/0088219 A1 | 4/2008 | Yoon et al. | |
| 2008/0095694 A1 | 4/2008 | Nakayama et al. | |
| 2008/0129666 A1 | 6/2008 | Shimotono et al. | |
| 2008/0138589 A1 | 6/2008 | Wakabayashi et al. | |
| 2008/0143906 A1* | 6/2008 | Allemand et al. | 349/43 |
| 2008/0145302 A1* | 6/2008 | Renteln | 423/447.2 |
| 2008/0164801 A1* | 7/2008 | Min et al. | 313/309 |
| 2008/0170982 A1* | 7/2008 | Zhang et al. | 423/447.3 |
| 2008/0192014 A1* | 8/2008 | Kent et al. | 345/173 |
| 2008/0238882 A1* | 10/2008 | Sivarajan et al. | 345/174 |
| 2008/0248235 A1 | 10/2008 | Feng et al. | |
| 2008/0252202 A1 | 10/2008 | Li et al. | |
| 2008/0266273 A1* | 10/2008 | Slobodin et al. | 345/174 |
| 2008/0277718 A1 | 11/2008 | Ionescu et al. | |
| 2009/0032777 A1* | 2/2009 | Kitano et al. | 252/510 |
| 2009/0035469 A1* | 2/2009 | Sue et al. | 427/282 |
| 2009/0056854 A1* | 3/2009 | Oh et al. | 156/60 |
| 2009/0059151 A1* | 3/2009 | Kim et al. | 349/139 |
| 2009/0068241 A1* | 3/2009 | Britz et al. | 424/409 |
| 2009/0101488 A1 | 4/2009 | Jiang et al. | |
| 2009/0153511 A1* | 6/2009 | Jiang et al. | 345/173 |
| 2009/0153513 A1 | 6/2009 | Liu et al. | |
| 2009/0153514 A1 | 6/2009 | Jiang et al. | |
| 2009/0153516 A1 | 6/2009 | Liu et al. | |
| 2009/0153520 A1* | 6/2009 | Jiang et al. | 345/174 |
| 2009/0167147 A1* | 7/2009 | Jeng et al. | 313/498 |
| 2009/0167709 A1 | 7/2009 | Jiang et al. | |
| 2009/0208708 A1 | 8/2009 | Wei et al. | |
| 2009/0283211 A1 | 11/2009 | Matsuhira | |
| 2009/0293631 A1* | 12/2009 | Radivojevic | 73/774 |
| 2009/0326128 A1* | 12/2009 | Macossay-Torres | 524/413 |
| 2010/0001972 A1 | 1/2010 | Jiang et al. | |
| 2010/0001975 A1 | 1/2010 | Jiang et al. | |
| 2010/0001976 A1 | 1/2010 | Jiang et al. | |
| 2010/0007619 A1 | 1/2010 | Jiang et al. | |
| 2010/0007624 A1* | 1/2010 | Jiang et al. | 345/173 |
| 2010/0007625 A1* | 1/2010 | Jiang et al. | 345/173 |
| 2010/0065788 A1 | 3/2010 | Momose et al. | |
| 2010/0078067 A1 | 4/2010 | Jia et al. | |
| 2010/0093247 A1 | 4/2010 | Jiang et al. | |
| 2010/0171099 A1 | 7/2010 | Tombler, Jr. et al. | |
| 2010/0220074 A1* | 9/2010 | Irvin et al. | 345/174 |
| 2010/0271330 A1 | 10/2010 | Philipp | |
| 2011/0032196 A1 | 2/2011 | Feng et al. | |
| 2011/0304579 A1* | 12/2011 | Feng et al. | 345/174 |
| 2012/0105371 A1 | 5/2012 | Hotelling et al. | |
| 2012/0107591 A1* | 5/2012 | Wang et al. | 428/220 |
| 2012/0251766 A1* | 10/2012 | Jiang et al. | 428/114 |
| 2012/0276671 A1* | 11/2012 | Wei et al. | 438/42 |
| 2012/0301663 A1* | 11/2012 | Koike et al. | 428/114 |

FOREIGN PATENT DOCUMENTS

| | | |
|---|---|---|
| CN | 1447279 A | 10/2003 |
| CN | 1482472 | 3/2004 |
| CN | 1483667 | 3/2004 |
| CN | 1484865 | 3/2004 |
| CN | 1501317 | 6/2004 |
| CN | 1503195 | 6/2004 |
| CN | 1509982 | 7/2004 |
| CN | 1519196 | 8/2004 |
| CN | 2638143 | 9/2004 |
| CN | 1543399 | 11/2004 |

| | | | | | | |
|---|---|---|---|---|---|---|
| CN | 1543399 A | 11/2004 | | JP | 2007-299409 | 11/2007 |
| CN | 2706973 | 6/2005 | | JP | 2007-310869 | 11/2007 |
| CN | 1671481 | 9/2005 | | JP | 2008-102968 | 5/2008 |
| CN | 1675580 | 9/2005 | | JP | 2008-139711 | 6/2008 |
| CN | 1690915 A | 11/2005 | | JP | 2008-536710 | 9/2008 |
| CN | 1738018 | 2/2006 | | JP | 2008-542953 | 11/2008 |
| CN | 1744021 A | 3/2006 | | JP | 2009-104577 | 5/2009 |
| CN | 1745302 | 3/2006 | | KR | 0525731 | 11/2005 |
| CN | 1803594 | 7/2006 | | KR | 20060129977 | 12/2006 |
| CN | 1823320 | 8/2006 | | KR | 20070012414 | 1/2007 |
| CN | 1292292 C | 12/2006 | | KR | 20070081902 | 8/2007 |
| CN | 2844974 Y | 12/2006 | | KR | 2007-0108077 | 11/2007 |
| CN | 1903793 | 1/2007 | | TW | 131955 | 4/1990 |
| CN | 1942853 | 4/2007 | | TW | 341684 | 10/1998 |
| CN | 1947203 | 4/2007 | | TW | 498266 | 8/2002 |
| CN | 1948144 | 4/2007 | | TW | 508652 | 11/2002 |
| CN | 1315362 | 5/2007 | | TW | 521227 | 2/2003 |
| CN | 1982209 | 6/2007 | | TW | 200403498 | 3/2004 |
| CN | 1996620 | 7/2007 | | TW | 242732 | 9/2004 |
| CN | 1998067 | 7/2007 | | TW | 200518195 | 6/2005 |
| CN | 101017417 | 8/2007 | | TW | I233570 | 6/2005 |
| CN | 101059738 | 10/2007 | | TW | I234676 | 6/2005 |
| CN | 101165883 | 4/2008 | | TW | 200522366 | 7/2005 |
| CN | 101239712 | 8/2008 | | TW | 284963 | 1/2006 |
| CN | 101248411 | 8/2008 | | TW | I249134 | 2/2006 |
| DE | 202007006407 | 9/2007 | | TW | I249708 | 2/2006 |
| EP | 1739692 | 1/2007 | | TW | I251710 | 3/2006 |
| JP | S61-231626 | 10/1986 | | TW | I253846 | 4/2006 |
| JP | 61-283918 | 12/1986 | | TW | 200622432 | 7/2006 |
| JP | S62-63332 | 3/1987 | | TW | I258708 | 7/2006 |
| JP | 62-139028 | 6/1987 | | TW | I261716 | 9/2006 |
| JP | S62-182916 | 8/1987 | | TW | I267014 | 11/2006 |
| JP | S62-190524 | 8/1987 | | TW | M306694 | 2/2007 |
| JP | 1-214919 | 8/1989 | | TW | 200710493 | 3/2007 |
| JP | H2-8926 | 1/1990 | | TW | 200713337 | 4/2007 |
| JP | 1991-54624 | 3/1991 | | TW | 200717083 | 5/2007 |
| JP | H3-54624 | 3/1991 | | TW | 200719198 | 5/2007 |
| JP | 5-53715 | 3/1993 | | TW | D117141 | 5/2007 |
| JP | H06-28090 | 2/1994 | | TW | 200722559 | 6/2007 |
| JP | H6-67788 | 3/1994 | | TW | 200727163 | 7/2007 |
| JP | 1995-28598 | 1/1995 | | TW | 284927 | 8/2007 |
| JP | 8-287775 | 11/1996 | | TW | 200729241 | 8/2007 |
| JP | H10-63404 | 3/1998 | | TW | 200736979 | 10/2007 |
| JP | 2001-34419 | 2/2001 | | TW | 200737414 | 10/2007 |
| JP | 2001-267782 | 9/2001 | | TW | 200738558 | 10/2007 |
| JP | 2002519754 | 7/2002 | | TW | I287669 | 10/2007 |
| JP | 2002-278701 | 9/2002 | | TW | 200926471 | 6/2009 |
| JP | 2003-99192 | 4/2003 | | TW | 200928914 | 7/2009 |
| JP | 2003-99193 | 4/2003 | | TW | 200929638 | 7/2009 |
| JP | 2003-288164 | 10/2003 | | TW | 200929643 | 7/2009 |
| JP | 2003303978 | 10/2003 | | TW | 201005612 | 7/2009 |
| JP | 2004-26532 | 1/2004 | | WO | WO02076724 | 10/2002 |
| JP | 2004-102217 | 4/2004 | | WO | WO02076724 A1 | 10/2002 |
| JP | 2004-189573 | 7/2004 | | WO | WO2004019119 | 3/2004 |
| JP | 2004-253796 | 9/2004 | | WO | WO2004052559 | 6/2004 |
| JP | 2004-266272 | 9/2004 | | WO | WO2004114105 | 12/2004 |
| JP | 2005-67976 | 3/2005 | | WO | WO2005102924 | 11/2005 |
| JP | 2005-85485 | 3/2005 | | WO | WO2005104141 | 11/2005 |
| JP | 2005-176428 | 6/2005 | | WO | WO2006003245 | 1/2006 |
| JP | 2005-182339 | 7/2005 | | WO | WO2006014241 | 2/2006 |
| JP | 2005-222182 | 8/2005 | | WO | WO2006030981 | 3/2006 |
| JP | 2005-286158 | 10/2005 | | WO | WO2006031981 | 3/2006 |
| JP | 2006-171336 | 6/2006 | | WO | WO2006120803 | 11/2006 |
| JP | 2006-228818 | 8/2006 | | WO | WO2006126604 | 11/2006 |
| JP | 2006-243455 | 9/2006 | | WO | WO2006130366 | 12/2006 |
| JP | 2006-521998 | 9/2006 | | WO | WO2007008518 | 1/2007 |
| JP | 2006-269311 | 10/2006 | | WO | 2007012899 | 2/2007 |
| JP | 2006-285068 | 10/2006 | | WO | 2007022226 | 2/2007 |
| JP | 2006-330883 | 12/2006 | | WO | WO2007063751 | 6/2007 |
| JP | 2007-11997 | 1/2007 | | WO | WO2007066649 | 6/2007 |
| JP | 2007-31238 | 2/2007 | | WO | WO2007099975 | 9/2007 |
| JP | 2007-73706 | 3/2007 | | WO | WO2008013517 | 1/2008 |
| JP | 2007-112133 | 5/2007 | | | | |
| JP | 2007-123870 | 5/2007 | | | | |
| JP | 2007-161563 | 6/2007 | | | | |
| JP | 2007-161576 | 6/2007 | | | | |
| JP | 2007-182357 | 7/2007 | | | | |
| JP | 2007-182546 | 7/2007 | | | | |
| JP | 2007-229989 | 9/2007 | | | | |

OTHER PUBLICATIONS

George Gruner, "Carbon Nanonets Spark New Electronics", Scientific American, pp. 76-83, May 2007.

Yagasaki Takuya, Nakanishi Rou, "Resistance Film Type Touch Panel", Technologies and Developments of Touch Panels, Amc, First Impression, pp. 80-93, Dec. 27, 2004(the 2nd Paragraph on p. 81 and the 2nd Paragraph on p. 91 may be relevant).

Ri Kurosawa, "Technology Trends of Capacitive Touch Panel", Technology and Development of Touch Panel, Amc, First Impression, pp. 54-64, Dec. 27, 2004(the 6th paragraph on p. 55 may be relevant).

Mei Zhang etal., "Strong Transparent, Multifunctional, Carbon Nanotube Sheets", Science, America, AAAS, vol. 309, pp. 1215-1219, Aug. 19, 2005.

Kai-Li Jiang, Qun-Qing Li, Shou-Shan Fan, "Continuous carbon nanotube yarns and their applications", Physics, China, pp. 506-510,Aug. 31, 2003,32(8)(lines from the 4th line to 35th line in the right col. of p. 507 may be relevant).

Yu Xiang, Technique of Touch Panel & the Production of Resistance-type Touch Panel Insulation Dot, Journal of Longyan Teachers College, p. 25-26, vol. 22, No. 6, 2004.

Kazuhiro Noda, Kohtaro Tanimura, Production of Transparent Conductive Films with Inserted SiO2 Anchor Layer, and Application to a Resistive Touch Panel, Electronics and Communications in Japan, No. 7, 2001, pp. 39-45, vol. 84.

ASM Handbook."Volume 2 Properties and Selection: Nonferrous Alloys and Special-Purpose Materials".Apr. 2007; pp. 840-853.

Susuki et al. "Investigation of physical and electric properties of silver pastes as binder for thermoelectric materials". Review of Scientific Instruments,76,(2005);pp. 023907-1 to 023907-5.

Fan et al. "Self-Oriented Regular Arrays of Carbon Nanotubes and Their Field Emission Properties". Science, vol. 283, (1999);pp. 512-514.

Wu et al."Transparent, Conductive Carbon Nanotube Films". Science,vol. 305,(2004);pp. 1273-1276.

R Colin Johnson, "Carbon nanotubes aim for cheap, durable touch screens", Aug. 2007 http://psroc.phys.ntu.edu.tw/bimonth/v27/615.pdf.

Xianglin Liu, "strong, transparent, multifunctional carbon nanotube sheets", pp. 720-721, Oct. 2005 http://www.eettaiwan.com/articleLogin.do?artId=8800474428&fromWhere=/ART_8800474428_480502_NT_95e7014f.HTM&catId=480502&newsType=NT&pageNo=null&encode=95e7014f.

* cited by examiner

TOUCH PANEL, LIQUID CRYSTAL DISPLAY SCREEN USING THE SAME, AND METHODS FOR MAKING THE TOUCH PANEL AND THE LIQUID CRYSTAL DISPLAY SCREEN

RELATED APPLICATIONS

This application is related to applications entitled, "TOUCH PANEL", filed on Aug. 13, 2009, and application Ser. No. 12/583,162; "METHOD FOR MAKING TOUCH PANEL", filed on Sep. 3, 2009, and application Ser. No. 12/584,415; "METHOD FOR MAKING LIQUID CRYSTAL DISPLAY SCREEN", filed on Aug. 13, 2009, and application Ser. No. 12/583,160; "METHOD FOR MAKING LIQUID CRYSTAL DISPLAY SCREEN", filed on Sep. 3, 2009, and application Ser. No. 12/584,410; "LIQUID CRYSTAL DISPLAY SCREEN", filed on Jul. 2, 2009, and application Ser. No. 12/459,566; and "LIQUID CRYSTAL DISPLAY SCREEN", filed on Aug. 13, 2009, and application Ser. No. 12/583,161.

BACKGROUND

1. Technical Field

The present disclosure relates to touch panels and liquid crystal display screens and, particularly, to a carbon nanotube based touch panel, a liquid crystal display screen using the same, and methods for making the touch panel and the liquid crystal display screen.

2. Description of Related Art

Liquid crystal display screens are relatively thin, light weight, have low power consumption. Liquid crystal display screens have been widely used in various electronic apparatuses having displaying functions such as computers and televisions as well as on portable devices such as mobile phones, car navigation systems, and personal digital assistants (PDAs).

Following the advancement in recent years of various electronic apparatuses, toward high performance and diversification, there has been continuous growth in the number of electronic apparatuses equipped with optically transparent touch panels in front of their respective liquid crystal display screens. A user of any such electronic apparatus operates it by pressing or touching the touch panel with a finger, a pen, a stylus, or another like tool while visually observing the display of the liquid crystal display screen through the touch panel. Therefore, a demand exists for touch panels and liquid crystal display screens using the same that provide superior in visibility and reliable operation.

Up to the present time, different types of touch panels, including resistance, capacitance, infrared, and surface sound-wave types have been developed. Due to their higher accuracy and low-cost of production, the resistance-type touch panels have been widely used.

Typical resistance-type touch panel includes an upper substrate and a lower substrate. The upper substrate includes an optically transparent upper conductive layer and two upper electrodes connected to the optically transparent upper conductive layer at two edges along the X direction respectively. The lower substrate includes an optically transparent lower conductive layer and two lower electrodes connected to the optically transparent upper conductive layer at two edges along the Y direction respectively. The upper substrate is a transparent and flexible film or plate. The lower substrate is a transparent and rigid plate made of glass. The optically transparent upper conductive layer and the optically transparent lower conductive layer are formed of conductive indium tin oxide (ITO). The upper electrodes and the lower electrodes are formed by silver paste layers.

In operation, an upper surface of the upper substrate is pressed with a finger, a pen or the like tool, and visual observation of a screen on the display device provided on a back side of the touch panel is allowed. This causes the upper substrate to be deformed, and the upper conductive layer thus comes in contact with the lower conductive layer at the position where pressing occurs. Voltages are applied successively from an electronic circuit to the optically transparent upper conductive layer and the optically transparent lower conductive layer. Thus, the deformed position can be detected by the electronic circuit.

However, the ITO layer generally has poor mechanical durability, low chemical endurance, and provides for uneven resistance over an entire area of the touch panel. Moreover, the ITO layer has relatively low transparency in a humid environment. All the above-mentioned problems of the ITO layer tend to yield a touch panel with somewhat low sensitivity, accuracy, and brightness. Furthermore, the ITO layer is generally formed by means of ion-beam sputtering, and this method is relatively complicated.

What is needed, therefore, is to provide a touch panel, a liquid crystal display screen using the same, and methods for making the touch panel and the liquid crystal display, the touch panel and the liquid crystal display screen having good durability, high sensitivity, accuracy, and brightness to overcome the aforementioned shortcomings.

BRIEF DESCRIPTION OF THE DRAWINGS

Many aspects of the present touch panel, the liquid crystal display screen using the same, and the methods for making the touch panel and the liquid crystal display screen can be better understood with reference to the following drawings. The components in the drawings are not necessarily to scale, the emphasis instead being placed upon clearly illustrating the principles of the present touch panel, the liquid crystal display screen using the same, and the method for making the touch panel and the liquid crystal display screen.

Figure 1:
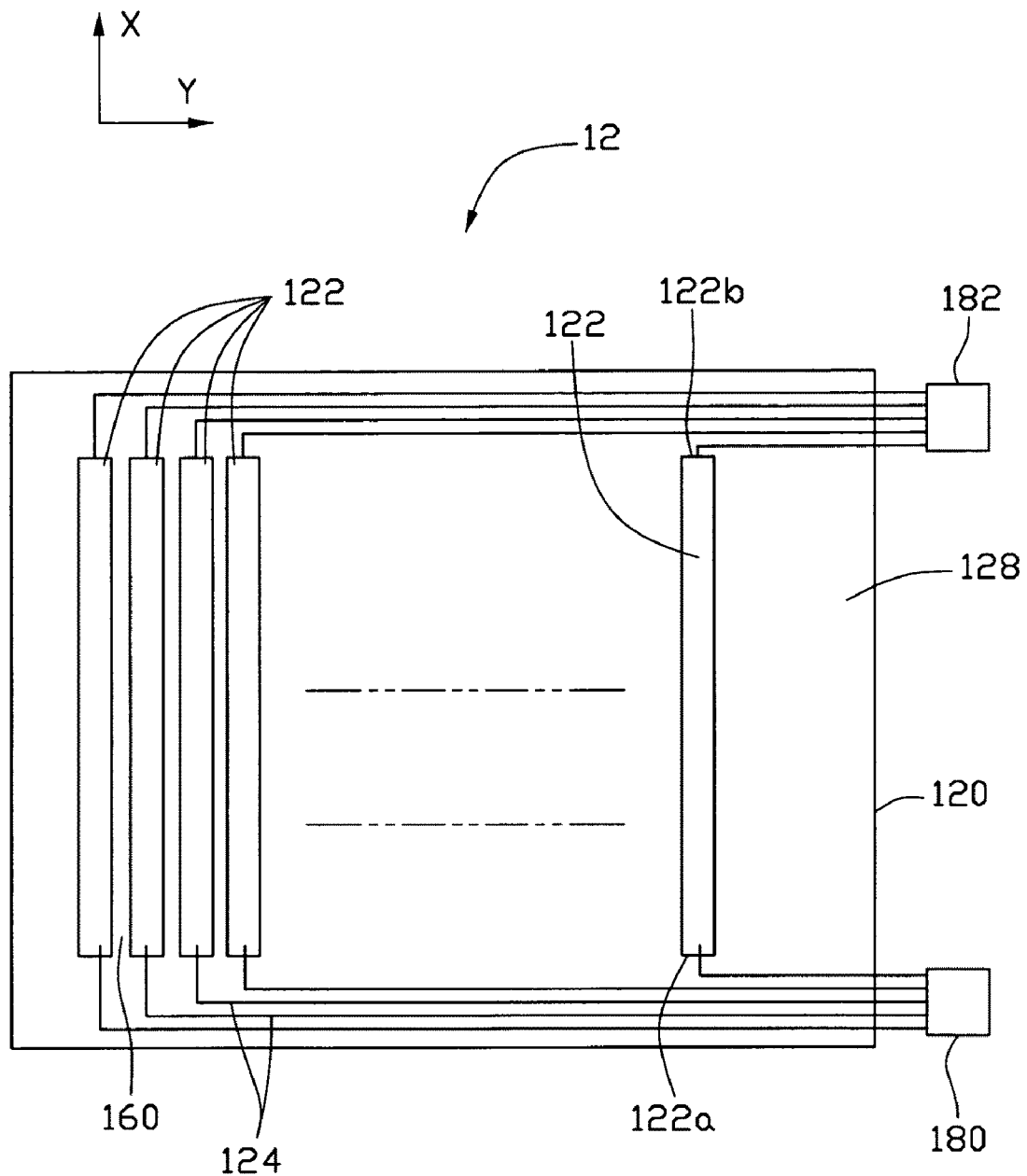
FIG. 1 is a schematic top view of a first electrode board of a touch panel in accordance with the embodiment of FIG. 3.

Corresponding reference characters indicate corresponding parts throughout the several views. The exemplifications set out herein illustrate at least one embodiment of the present touch panel, the liquid crystal display screen using the same, and the method for making the touch panel and the liquid crystal display screen in at least one form, and such exemplifications are not to be construed as limiting the scope of the invention in any manner.

DETAILED DESCRIPTION

Reference will now be made to the drawings to describe, in detail, embodiments of the present touch panel, the liquid crystal display screen using the same, and the method for making the touch panel and the liquid crystal display screen.

Figure 2:
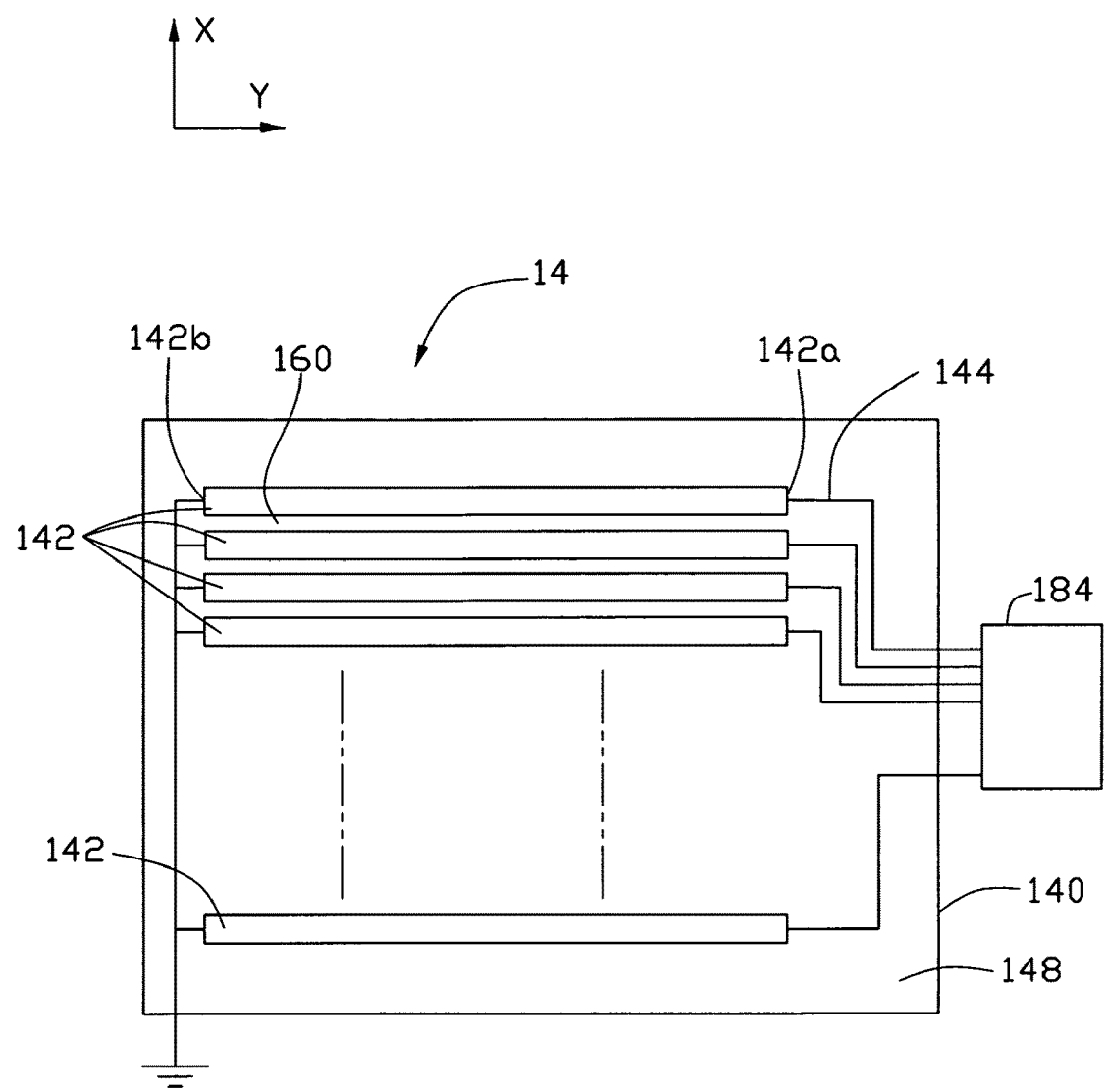
FIG. 2 is a schematic top view of a second electrode board of the touch panel in accordance with the embodiment of FIG. 3.
Figure 3:
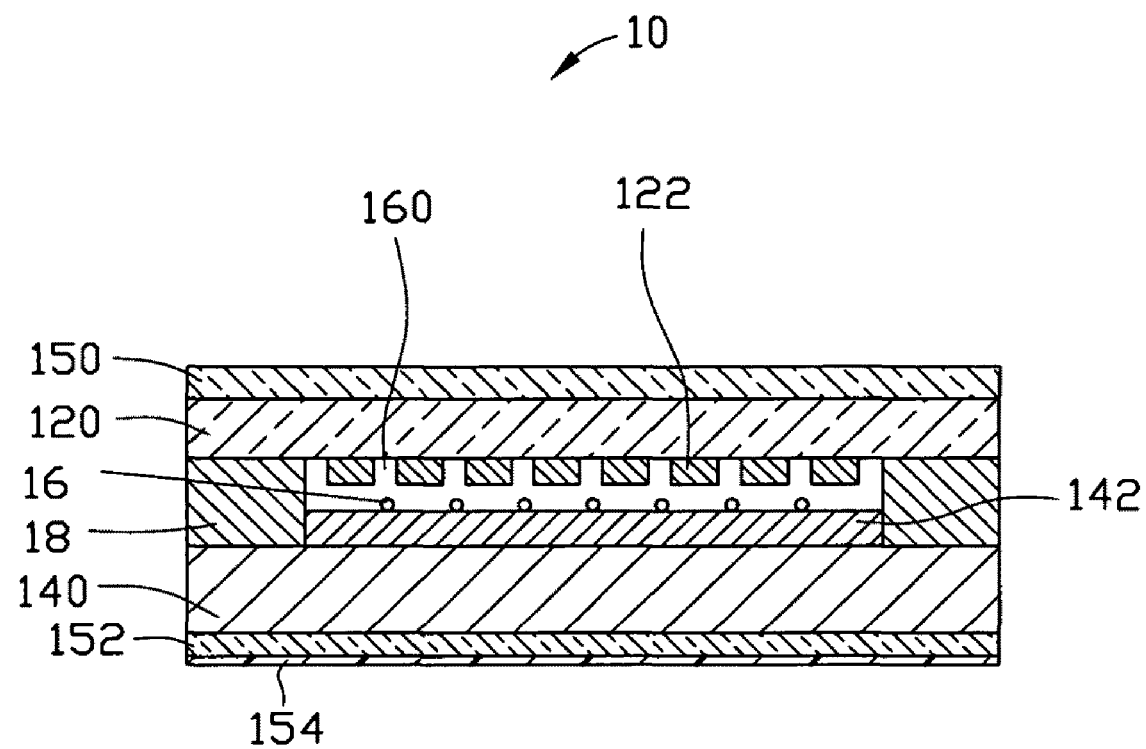
FIG. 3 is a cross-sectional view of the touch panel in accordance with an embodiment.

Referring to FIGS. 1 to 3, a resistance-type touch panel 10 in one embodiment includes a first electrode plate 12, a second electrode plate 14 facing to the first electrode plate 12, and a plurality of dot spacers 16 disposed between the first electrode plate 12 and the second electrode plate 14.

The first electrode plate 12 includes a first substrate 120, a plurality of first transparent electrodes 122, and a plurality of first signal wires 124. The plurality of first transparent electrodes 122 are located on the first substrate 120, and aligned along a first direction. The plurality of first transparent electrodes 122 are parallel to each other and uniformly spaced. In this embodiment, the first direction is along the X axis. Each of the plurality of the first transparent electrodes 122 has a first end 122a and a second end 122b. The first end 122a of each of the plurality of the first transparent electrodes 122 is connected to an X-coordinate drive power source 180 through one of the plurality of the first signal wires 124. The X-coordinate drive power source 180 applies a drive voltage to the plurality of first transparent electrodes 122. The second end 122b of each of the plurality of the first transparent electrodes 122 is connected to a sensor 182 through one of the plurality of the first signal wires 124. A distance between each two parallel and adjacent first transparent electrodes 122 can be in the range from about 20 microns to about 50 microns.

The second electrode plate 14 includes a second substrate 140, a plurality of second transparent electrodes 142, and a plurality of second signal wires 144. The plurality of second transparent electrodes 142 are located on the second substrate 140, and aligned along a second direction. The second transparent electrodes 142 are parallel to each other and uniformly spaced. In this embodiment, the second direction is along the Y axis, and the second direction is perpendicular to the first direction. Each of the plurality of the second transparent electrodes 142 has a first end 142a and a second end 142b. The first end 142a of each of the plurality of the second transparent electrodes 142 is connected to a Y-coordinate drive power source 184 through one of the plurality of the second signal wires 144. The Y-coordinate drive power source 184 applies a drive voltage to the plurality of second transparent electrodes 142. The second end 142b of each of the plurality of the second transparent electrodes 142 is grounded. The distance between each two parallel and adjacent second transparent electrodes 142 can be in the range from about 20 microns to about 50 microns.

Figure 4:
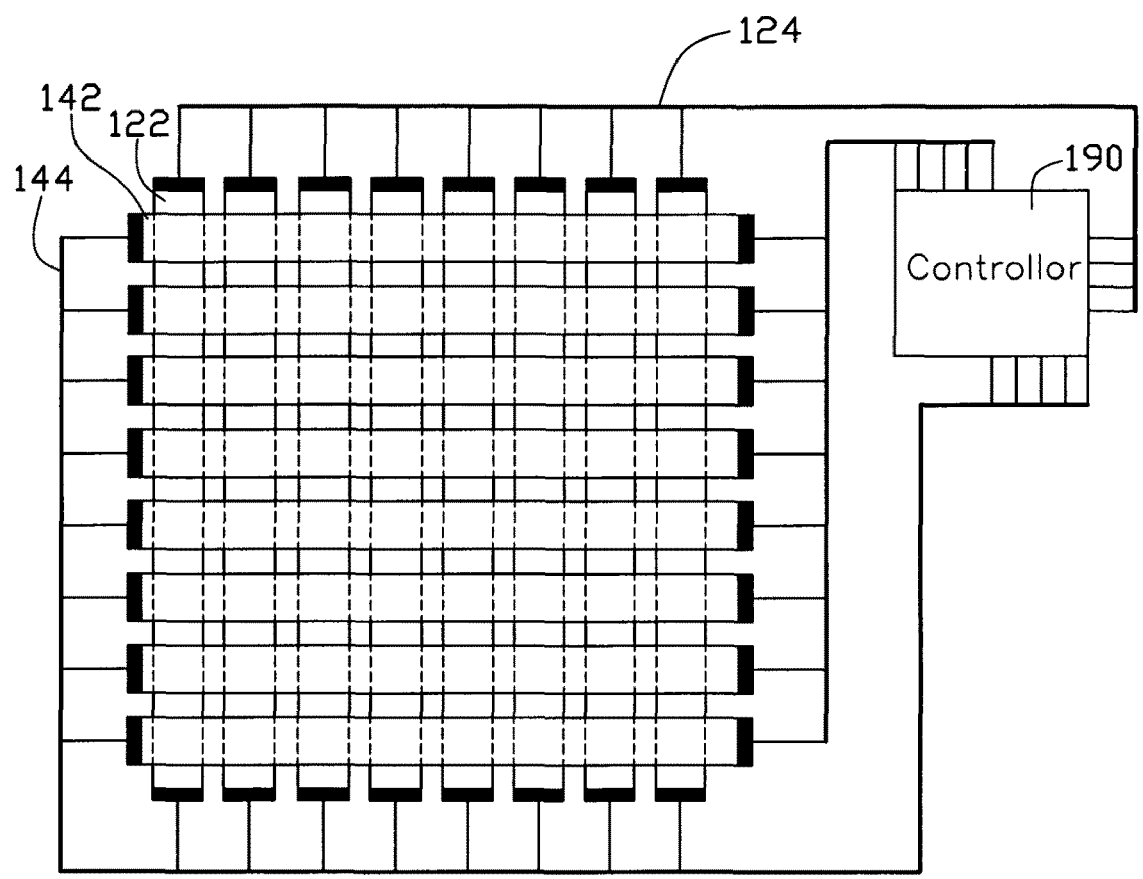
FIG. 4 is a circuit diagram of the touch panel of FIG. 3.

Referring to FIG. 4, the first transparent electrodes 122 each are strip-shaped films or a wires and are disposed on the first substrate 120 at regular intervals and spaced from each other. The number and configuration of the first transparent electrodes 122 can be varied. The number of the first transparent electrodes 122 generally depends on the desired sensitivity as well as the desired transparency. A sparse arrangement of the electrodes can increase the transparency, but decrease the sensitivity of the touch panel 10. More films generally increase sensitivity, but may reduce transparency (and vice versa). With regards to configuration, the first transparent electrodes 122 and 142 generally map the touch panel 10 into a coordinate system such as a Cartesian coordinate system, a Polar coordinate system or some other coordinate system. When a Cartesian coordinate system is used, the first transparent electrodes 122 typically correspond to X coordinates and the second transparent electrodes 142 typically correspond to Y coordinates. When a Polar coordinate system is used, the first transparent electrodes 122 typically correspond to radial (r) and the second transparent electrodes 142 typically correspond to angular coordinate (θ). In the shown embodiment, the first transparent electrodes 122 are arranged along the X coordinate corresponding to the Cartesian coordinate.

The second transparent electrodes 142 each are also strip-shaped films or wires and are disposed on the second substrate 140. The second transparent electrodes 142 are arranged along the Y coordinate corresponding to the Cartesian coordinate and orthogonal to the first transparent electrodes 122.

The first substrate 120 can be a transparent and flexible film or plate made of polymer, resin, or any other suitable flexible material. The second substrate 140 can be a rigid and transparent board made of glass, diamond, quartz, plastic or any other suitable material, or can be a transparent flexible film or plate similar to the first substrate 120 when the touch panel 10 is flexible. A material of the flexible film or plate can be selected from a group consisting of polycarbonate (PC), polymethyl methacrylate acrylic (PMMA), polyethylene terephthalate (PET), polyether polysulfones (PES), polyvinyl polychloride (PVC), benzocyclobutenes (BCB), polyesters, and acrylic resins. The thickness of the first substrate 120 and the second substrate 140 can be in the range from about 1 millimeter to about 1 centimeter. In one embodiment, the first substrate 120 and the second substrate 140 are both made of PET, and their thicknesses are both about 2 millimeters. It is to be understood that the material of the first substrate 120 and the second substrate 140 should not be restricted to the above-mentioned materials, but can be any of various other materials that can provide a suitable transparency and strength of the first substrate 120 and the second substrate 140.

The first signal wires 124 and second signal wires 144 can be formed of materials having relatively low resistance, such as ITO, antimony tin oxide (ATO), conductive resin, or any other suitable conductive materials. When the material of the first and second signal wires 124, 144 are to be shown, the diameter of the first and second signal wires 124, 144 should be very small (e.g., less than 100 microns) to avoid lowering the transparency of the touch panel 10. More specifically, the first and second signal wires 124, 144 made of metal, ITO, or ATO can be formed by depositing, etching, or printing. In one embodiment, the first and second signal wires 124, 144 are a plurality of carbon nanotube wires. A diameter of each of the carbon nanotube wires is in the approximate range from 0.5 nanometers to 100 microns. The carbon nanotube wires include a plurality of carbon nanotubes joined end to end. It is noted that because the carbon nanotubes have a high specific surface area, the carbon nanotube wires are adherent in nature. As such, the carbon nanotube wires can be directly laid on and adhered to the substrates. After adhered on the substrate, the carbon nanotube wires can be treated with a solvent to increase the adhesion with the substrate.

In one embodiment, the first transparent electrodes 122 and the second transparent electrodes 142 include a transparent carbon nanotube structure. The carbon nanotube structure can be in strip shaped or wire shaped. In this embodiment, all the carbon nanotube structures are strip shaped. The width of the carbon nanotube structures can be in the range from about 20 microns to about 250 microns. A thickness of the carbon nanotube structures can be in the range from about 0.5 nanometers to about 100 microns. Here, each carbon nanotube structure has the width of 50 microns, and the thickness of 50 nanometers.

The carbon nanotube structure can be composed of one single carbon nanotube film or include a plurality of carbon nanotube films stacked on and/or adjacent to each other. Thus, a thickness, length and width of the carbon nanotube structure can be set as desired and in a range where the carbon nanotube structure has an acceptable transparency.

The carbon nanotube film is formed by a plurality of carbon nanotubes, ordered or otherwise, and has a uniform thickness. The carbon nanotube film can be an ordered film or a disordered film. The ordered carbon nanotube film comprises of ordered carbon nanotubes. The disordered carbon nanotube film comprises of disordered carbon nanotubes. Ordered carbon nanotube films include films where the carbon nanotubes are arranged along a primary direction. Examples include films wherein the carbon nanotubes are arranged approximately along a same direction or have two or more sections within each of which the carbon nanotubes are arranged approximately along a same direction (different sections can have different directions). Disordered carbon nanotube films include randomly aligned carbon nanotubes. When the disordered carbon nanotube film comprises of a film wherein the number of the carbon nanotubes aligned in every direction is substantially equal, the disordered carbon nanotube film can be isotropic. The disordered carbon nanotubes can be entangled with each other and/or are substantially parallel to a surface of the disordered carbon nanotube film. In the ordered carbon nanotube film, the carbon nanotubes can be primarily oriented along a same direction. However, the ordered carbon nanotube film can also have sections of carbon nanotubes aligned in a common direction. The ordered carbon nanotube film can have two or more sections, and the sections can have different alignments.

Length and width of the carbon nanotube film can be arbitrarily set as desired. A thickness of the carbon nanotube film is in a range from about 0.5 nanometers to about 100 micrometers. The carbon nanotubes in the carbon nanotube film can be selected from the group consisting of single-walled, double-walled, multi-walled carbon nanotubes, and combinations thereof. Diameters of the single-walled carbon nanotubes, the double-walled carbon nanotubes, and the multi-walled carbon nanotubes can, respectively, be in the approximate range from 0.5 to 50 nanometers, 1 to 50 nanometers, and 1.5 to 50 nanometers.

Figure 5:
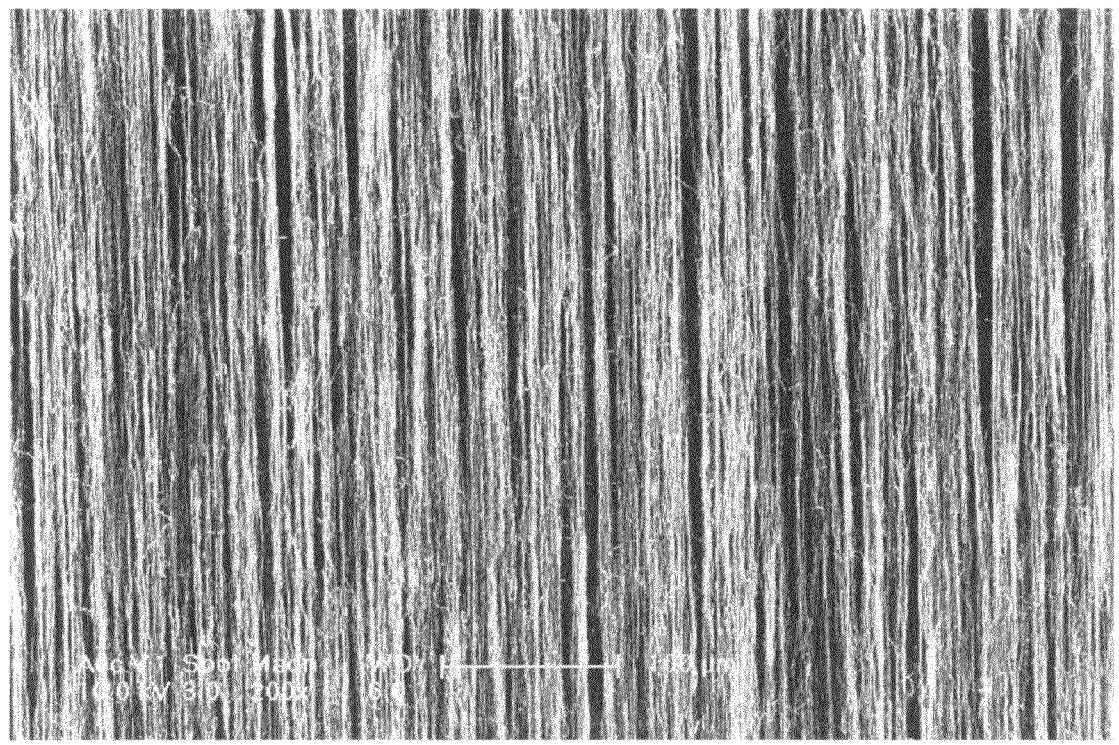
FIG. 5 shows a Scanning Electron Microscope (SEM) image of a carbon nanotube film.
Figure 6:
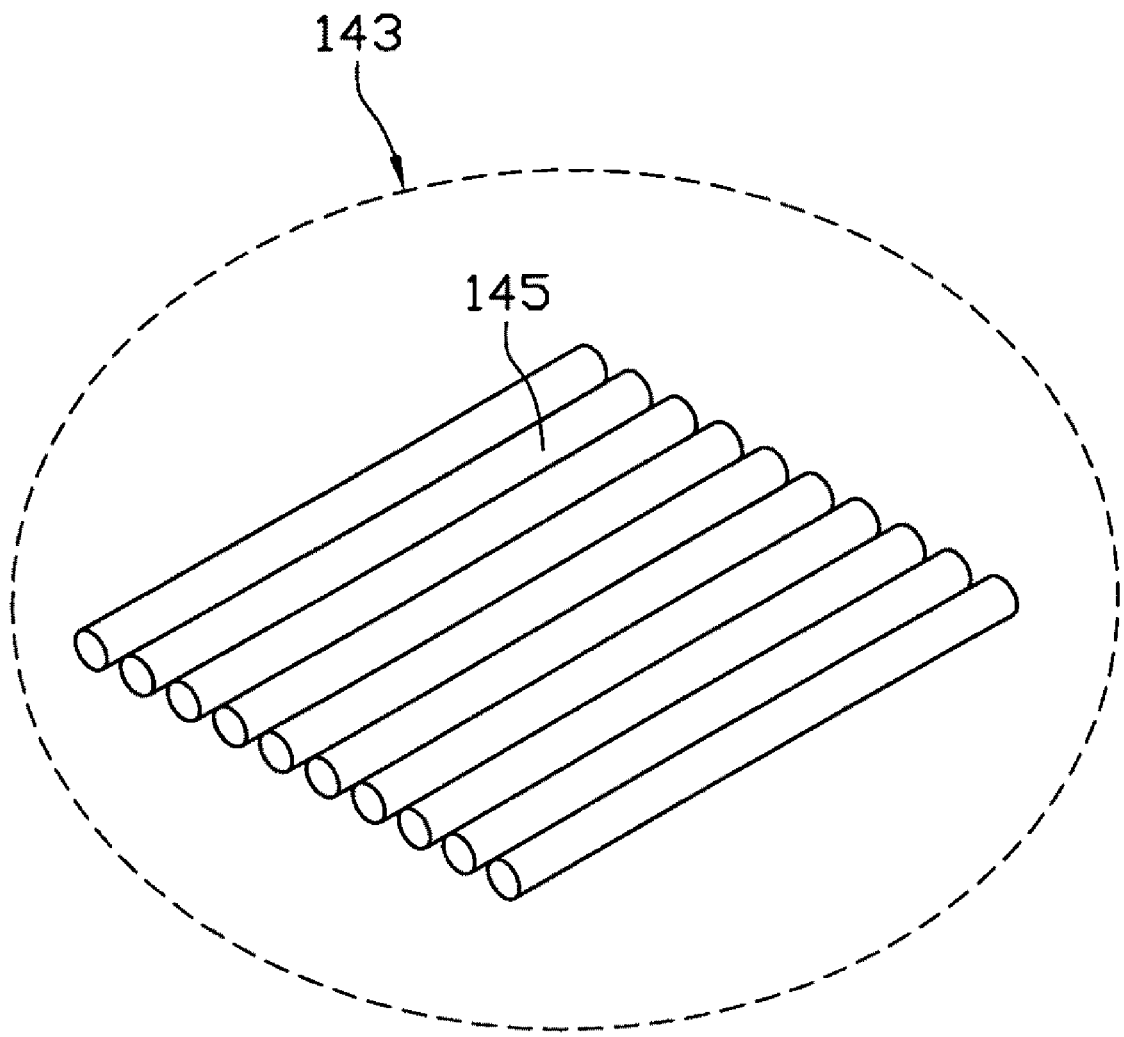
FIG. 6 is a structural schematic of a carbon nanotube segment in the carbon nanotube film of FIG. 5.

The ordered carbon nanotube film can be formed by drawing a film from a carbon nanotube array. The ordered carbon nanotube film that drawn from the carbon nanotube array is a free-standing carbon nanotube film. Referring to FIG. 5 and FIG. 6, the drawn carbon nanotube film includes a plurality of successive and oriented carbon nanotubes 145 joined end to end by van der Waals attractive force. The carbon nanotubes 145 in the drawn carbon nanotube film are substantially oriented along a same direction. Specifically, the drawn carbon nanotube film includes a plurality of successively oriented carbon nanotube segments 143 joined end-to-end by van der Waals attractive force therebetween. Each carbon nanotube segment 143 includes a plurality of carbon nanotubes 145 parallel to each other, and combined by van der Waals attractive force therebetween. The carbon nanotubes 145 in each carbon nanotube segment 143 are also oriented along a preferred orientation. A thickness of the drawn carbon nanotube film ranges from about 0.5 nanometers to about 100 microns. A maximum width and length of the drawn carbon nanotube film depends on the size of the carbon nanotube array from which it is drawn. In one embodiment, the width of the drawn carbon nanotube film can range from 0.5 nanometers to 10 centimeters. The drawn carbon nanotube film is flexible and has a relatively high toughness due to the van der Walls attractive force between the carbon nanotubes 145. The carbon nanotubes 145 in the drawn carbon nanotube film are uniformly arranged and parallel to a surface of the drawn carbon nanotube film, and thus, the drawn carbon nanotube film has excellent resistance distribution and light transparence.

When the carbon nanotube structure includes at least two stacked drawn carbon nanotube films, an angle α between the preferred orientation of the carbon nanotubes in the two adjacent drawn carbon nanotube films is in the rang from above 0° to about 90°.

In one embodiment, the carbon nanotubes in the first transparent electrodes 122 are arranged along the first direction, the carbon nanotubes in the second transparent electrodes 142 are arranged along the second direction. Thus, the conductivities of the first transparent electrodes 122 and the second transparent electrodes 142 can be improved by the aligned carbon nanotubes. As shown in FIG. 5, the majority of the carbon nanotubes are arranged along a primary direction; however, the orientation of some of the carbon nanotubes may vary.

The drawn carbon nanotube film is formed by a drawing (or pulling) method. The method for fabricating the drawn carbon nanotube film includes the steps of: (a) providing a carbon nanotube array capable of having a film drawn therefrom; and (b) pulling out a drawn carbon nanotube film from the carbon nanotube array, by using a tool (e.g., adhesive tape, pliers, tweezers, or another tool allowing multiple carbon nanotubes to be gripped and pulled simultaneously).

In step (b), the drawn carbon nanotube film can be formed by the substeps of: (b1) selecting one or more carbon nanotubes 145 having a predetermined width from the carbon nanotube array; and (b2) pulling the drawn carbon nanotubes to form carbon nanotube segments 143 at an even/uniform speed to achieve a uniform drawn carbon nanotube film.

In step (b2), the carbon nanotube segments 143 having a predetermined width can be selected by using an adhesive tape as the tool to contact the carbon nanotube array. Each carbon nanotube segment 143 includes a plurality of carbon nanotubes parallel to each other. In step (b2), the pulling direction is substantially perpendicular to the growing direction of the carbon nanotube array.

More specifically, during the pulling process, as the initial carbon nanotube segments 143 are drawn out, other carbon nanotube segments 143 are also drawn out end to end due to van der Waals attractive force between ends of adjacent carbon nanotube segments 143. This process of drawing ensures a substantially continuous and uniform drawn carbon nanotube film having a predetermined width can be formed. Referring to FIG. 5, the drawn carbon nanotube film includes a plurality of carbon nanotubes 145 joined ends to ends. The carbon nanotubes 145 in the drawn carbon nanotube film are all substantially parallel to the pulling/drawing direction of the drawn carbon nanotube film, and the drawn carbon nanotube film produced in such manner can be selectively formed to have a predetermined width. The drawn carbon nanotube film formed by the pulling/drawing method has superior uniformity of thickness and conductivity over many carbon nanotube films. Further, the pulling/drawing method is simple, fast, and suitable for industrial applications. The drawn carbon nanotube film can be cut into desired lengths and widths. They can also be placed side by side to create larger films.

It is noted that because the carbon nanotubes in the carbon nanotube array have a high purity and a high specific surface area, the carbon nanotube film is adhesive in nature. As such, the at least one drawn carbon nanotube film can be directly adhered to the surfaces of the first substrate 120, the second substrate 140, and/or another drawn carbon nanotube film. In the alternative, other bonding means can be applied. To form one carbon nanotube structure having a plurality of carbon nanotube films therein, the carbon nanotube films can stacked on each other.

An additional step of treating the drawn carbon nanotube films with an organic solvent after the drawn carbon nanotube films are adhered on the first and second substrates 120, 140 can be further provided. Specifically, the drawn carbon nanotube films can be treated by applying organic solvent to the drawn carbon nanotube films to soak the entire surfaces of the drawn carbon nanotube films. The organic solvent is volatile and can be selected from the group consisting of ethanol, methanol, acetone, dichloroethane, chloroform, and any appropriate mixture thereof. Here, the organic solvent is ethanol. After being soaked by the organic solvent, microscopically, carbon nanotube strings will be formed by adjacent carbon nanotubes in the drawn carbon nanotube film, that are able to do so, bundling together, due to the surface tension of the drying organic solvent. In one aspect, some and/or parts of the carbon nanotubes in the untreated drawn carbon nanotube film that are not adhered on the first and second substrates 120,140 will come into contact with the first and second substrates 120,140 after the organic solvent treatment due to the surface tension of the organic solvent. Then the contacting area of the drawn carbon nanotube films with the first and second substrates 120,140 will increase, and thus, the drawn carbon nanotube films can be firmly adhered to the first and second substrates 120,140. In another aspect, due to the decrease of the specific surface area via bundling, the mechanical strength and toughness of the drawn carbon nanotube films are increased and the coefficient of friction of the drawn carbon nanotube films is reduced. Macroscopically, the treated drawn carbon nanotube films will still look like uniform films.

Figure 7:
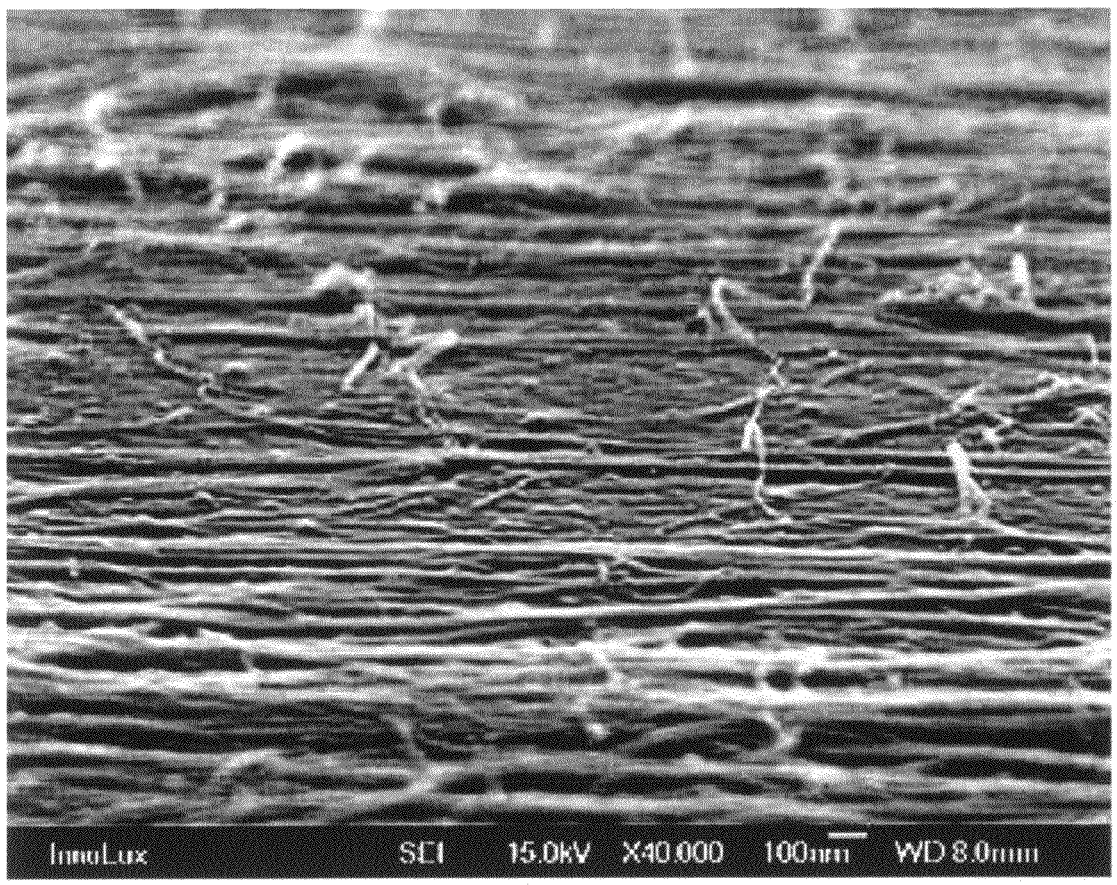
FIG. 7 shows a Scanning Electron Microscope (SEM) image of a carbon nanotube composite structure.

In one embodiment, at least one of the first transparent electrodes 122 and the second transparent electrodes 142 can include a transparent carbon nanotube composite structure. The carbon nanotube composite structure includes one or a plurality of carbon nanotube films. Referring to FIG. 7, an embodiment of the first and second transparent electrodes 122 and 142, the carbon nanotube composite structure includes the above-described drawn carbon nanotube film and a polymer material infiltrated in the drawn carbon nanotube film. It is to be understood that spaces exist between the adjacent carbon nanotubes in the carbon nanotube film, and thus the carbon nanotube film includes a plurality of micropores defined by the adjacent carbon nanotubes therein. The polymer material is filled into the micropores in the carbon nanotube film to form the carbon nanotube composite structure. The carbon nanotube film can be disordered carbon nanotube film or ordered carbon nanotube film. Here, the carbon nanotube film is ordered carbon nanotube film.

Similar to the carbon nanotube structure, a thickness of the carbon nanotube composite structure can be set as an acceptable transparency of the carbon nanotube composite structure is acquired. As shown in FIG. 7, the thickness of the carbon nanotube composite structure is in the range from about 0.5 nanometers to 1 millimeter. The carbon nanotube composite structure has substantially uniform thickness.

The polymer material is transparent and can be selected from the group consisting of polycarbonate (PC), polymethyl methacrylate acrylic (PMMA), polyethylene terephthalate (PET), benzocyclobutenes (BCB), polystyrene, polyethylene, polycarbonate, polycycloolefins, and any other suitable materials. Here, the polymer material is PMMA.

Figure 8:
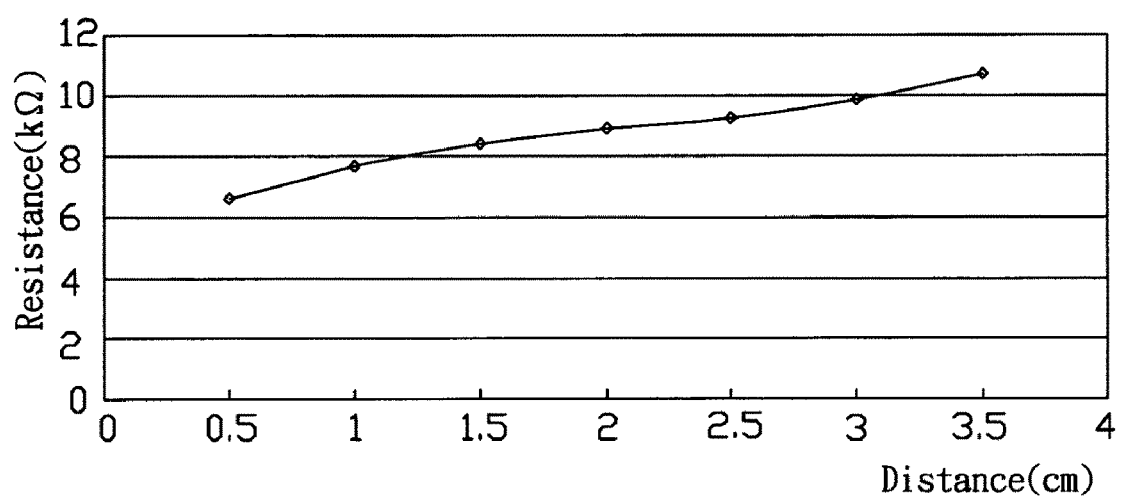
FIG. 8 is a diagram showing a relationship between resistances and distance between two locations on the carbon nanotube composite structure of FIG. 7.

The polymer material can also combine the carbon nanotube composite structure with the first substrate 120 and the second substrate 140 firmly. Accordingly, the life-span of the touch panel 10 is improved. Referring to FIG. 8, due to the polymer material infiltrated into the drawn carbon nanotube film, unwanted short circuits in the carbon nanotube structure are eliminated, and thus the carbon nanotube composite layer has a good linearity of the resistance to the distance. Accordingly, the accuracy of the touch panel 10 can be improved.

It is to be understood that, the carbon nanotube composite structure can be composed by the plurality of carbon nanotube composite films disposed side by side or stacked with each other. The carbon nanotube composite film can be formed by each carbon nanotube film infiltrated by the polymer material or having the entire carbon nanotube structure infiltrated by the polymer material.

In one embodiment, each of the first transparent electrodes 122 and the second transparent electrodes 142 includes the carbon nanotube composite structure. The carbon nanotube composite structure includes one drawn carbon nanotube film infiltrated by the PMMA. The carbon nanotubes in the first transparent electrodes 122 are aligned along the first direction. The carbon nanotubes in the second transparent electrodes 142 are aligned along the second direction.

In one embodiment, the carbon nanotube composite structure is formed by having the first substrate 120 and second substrate 140 coated with a layer of polymer material solution. Then, the drawn carbon nanotube films are laid on the layer of polymer material solution. After that, a pressure is applied on the drawn carbon nanotube film to make the polymer material solution infiltrate into the carbon nanotube film. Finally, the polymer material solution is solidified by a heating step. A wind knife with a wind force of 10 meters per second (m/s) to 20 m/s can be used to blow the carbon nanotube film. The carbon nanotube film is pressed into the layer of polymer material solution, and the micropores of the carbon nanotube film are filled with the polymer material solution by the wind force.

The polymer material solution can be made of an organic solvent and the polymer material dissolved in the organic solvent. The polymer material solution can be in liquid state and adhesive, and thus the polymer material solution can be adhered directly on the first substrate 120 to form the layer of the polymer material solution on the first substrate 120. In one embodiment, the viscosity of the polymer material solution is greater than 1 Pascal second (Pa sec). The polymer material is transparent and is a solid in room temperature. The polymer material can be selected from the group consisting of polycarbonate (PC), polymethyl methacrylate acrylic (PMMA), polyethylene terephthalate (PET), benzocyclobutenes (BCB), polystyrene, polyethylene, polycarbonate, and polycycloolefins and any other suitable materials. The organic solvent is volatile at room temperature, and can be selected from the group consisting of ethanol, methanol, acetone, dichloroethane, chloroform, and combinations thereof. The organic solvent can be eliminated by the heating step. In one embodiment, the polymer material is PMMA, the polymer material solution is the solution of PMMA in ethanol.

It is to be understood that, the carbon nanotube wires can be used in the first and/or second signal wires 124, 144, and the carbon nanotube wires can be made by the drawn carbon nanotube films. The carbon nanotube wire can be twisted or untwisted. The untwisted carbon nanotube wire can be formed by treating the drawn carbon nanotube film with an organic solvent. Specifically, the drawn carbon nanotube film is treated by applying the organic solvent to the carbon nanotube film to soak the surface of the drawn carbon nanotube film without being adhered on a substrate. After being soaked by the organic solvent, the adjacent paralleled carbon nanotubes in the drawn carbon nanotube film will bundle together, due to the surface tension of the organic solvent when the organic solvent volatilizing, and thus, the drawn carbon nanotube film will be shrunk into untwisted carbon nanotube wire. The organic solvent is volatile. The twisted carbon nanotube wire can be formed by twisting a drawn carbon nanotube film by using a mechanical force to turn the two ends of the drawn carbon nanotube film in opposite directions.

Further, a filling layer 160 can be further located in gaps between the adjacent first transparent electrodes 122 and the adjacent second transparent electrodes 142 to improve the visual appearance of the touch panel 100. The filling layer 160 can be made of a material with a refractive index and a transmissivity similar to that of the first and second transparent electrodes 122, 142.

The sensor 182 is used for detecting the corresponding first transparent electrode 122 driven by the X-coordinate drive power source 180 and the corresponding second transparent electrode 142 driven by the Y-coordinate drive power source 184 when a variation of the voltage is occurred.

An insulative layer 18 can be further provided between the first and the second electrode plates 12 and 14, and located around edges of the second surface 148 of the second substrate 140. The first electrode plate 12 is located on the insulative layer 18. The insulative layer 18 can seal the gap between the first electrode plate 12 and the second electrode plate 14. The first transparent electrodes 122 are opposite to, and spaced from the second transparent electrodes 142. The dot spacers 16, if used, can be located on the second transparent electrodes 142. A distance between the second electrode plate 14 and the first electrode plate 12 can be in an approximate range from 2 to 20 microns. The insulative layer 18 and the dot spacers 16 are made of, for example, insulative resin or any other suitable insulative material. Insulation between the first electrode plate 12 and the second electrode plate 14 is provided by the insulative layer 18 and the dot spacers 16 when the touch panel 10 is not in use. It is to be understood that the dot spacers 16 are optional, particularly when the touch panel 10 is relatively small. The dot spacers 16 serve as supports given the size of the span and the strength of the first electrode plate 12.

A transparent protective film 150 can be further located on the top surface of the touch panel 10. The transparent protective film 150 can be a film that receives a surface hardening treatment to protect the first electrode plate 12 from being scratched when the touch panel 10 is in use. The transparent protective film 150 can be plastic or resin.

The touch panel 10 can further include a shielding layer 152 located on the lower surface of the second substrate 140. The material of the shielding layer 152 can be selected from a group consisting of indium tin oxide, antimony tin oxide, carbon nanotube film, and other conductive materials. In one embodiment, the shielding layer 152 is a carbon nanotube film. The shielding layer 152 is connected to ground and plays a role of shielding and, thus, enables the touch panel 10 to operate without interference (e.g., electromagnetic interference). Furthermore, a passivation layer 154 can be located on a surface of the shielding layer 152, on the side away from the second substrate 140. The material of the passivation layer 154 can, for example, be silicon nitride or silicon dioxide. The passivation layer 154 can protect the shielding layer 152 from chemical or mechanical damage.

As shown in FIG. 4, the touch panel 10 can further includes a controller 190 that incorporates the X-coordinate drive power source 180, sensor 182, Y-coordinate drive power source 184, and a grounded point. The controller 190 acquires the data from the first and second transparent electrodes 122, 142. In one embodiment, the controller 190 may include a storage element for storing a touch screen program, which is capable of controlling different aspects of the touch panel 10 and is configured for sending raw data to a processor so that the processor processes the raw data. For example, the processor receives data from the controller 190 and determines how the data is to be used within an electronic apparatuses adopting the touch panel 10. The data may include the coordinates of each touching point as well as the pressure exerted on each touching point. In another embodiment, the controller 190 is configured for processing the raw data itself. That is, the controller 190 reads the pulses from the first and second transparent electrodes 122, 142 and turns them into data that the processor can understand. The controller 190 may perform filtering and/or conversion processes. Filtering process is typically implemented to reduce a busy data stream so that the processor is not overloaded with redundant or non-essential data. The conversion processes may be implemented to adjust the raw data before sending or reporting them to the processor. The conversions may include determining the center point for each touch region.

In use, when several fingers, such as four, or several styluses touch or scratch the surface of the touch panel 10 at almost the same time, four contact points T1-T4 can be formed between the first transparent electrodes 122 and the second transparent electrodes 142 at the same time. Then four separated signals S1-S4 for each touch point T1-T4 that occurs on the surface of the touch panel 10 at the same time are tracked. The number of recognizable touches can be about 15. 15 touch points allows for all 10 fingers, two palms and 3 others. The touch panel 10 recognizes the touch events on the surface thereof and thereafter output this information to the processor. The processor interprets the touch events and thereafter actions based on the touch events.

Specifically, the X-coordinate drive power source 180 apply voltages on the first transparent electrodes 122 one by one in separate time, and the Y-coordinate drive power source 184 apply voltages on the second transparent electrodes 142 one by one in separate time. A user touches or presses the top surface of the touch panel 10. The first electrode plate 12 is curved and the first transparent electrode 122 at the pressed position is in connecting with the second transparent electrode 142. The second ends 142b of the second electrodes 142 are grounded, and thus the sensor 182 can detect the corresponding first transparent electrode 122 driven by the X-coordinate drive power source 180 and the corresponding second transparent electrode 142 driven by the Y-coordinate drive power source 184 when a variation of the voltage is occurred. The coordinates X and Y of the pressed position is then detected.

When more than one point on the touch panel 10 are pressed at the same time, the first transparent electrodes 122 at more than one pressed locations are in connecting with the second transparent electrodes 142. Due to the X-coordinate drive power source 180 and Y-coordinate drive power source 184 applying voltages on the first transparent electrodes 122 and the second transparent electrodes 142 one by one in separate time, the sensor 182 can one-by-one detect all the corresponding first transparent electrodes 122 driven by the X-coordinate drive power source 180 and all the corresponding second transparent electrodes 142 driven by the Y-coordinate drive power source 184 when variations of the voltages are occurred. The coordinates X and Y of the pressed positions are then detected.

The multiple touch events can be separately or together to perform singular or multiple actions in the electronic apparatuses. When used separately, a first touch event may be used to perform a first action while a second touch event may be used to perform a second action that is different than the first action. The actions may for example include moving an object such as a cursor or pointer scrolling or panning, adjusting control settings, opening a file or document, viewing a menu, making a selection executing instructions, operating a peripheral device connected to the electronic apparatuses. When used together, first and second touch events may be used for performing one particular action. The particular action may for example include logging onto a computer or a computer network, permitting authorized individuals access to restricted areas of the computer or computer network, loading a user profile associated with a user's preferred arrangement of the computer desktop, permitting access to web content, launching a particular program, encrypting or decoding a message, and/or the like.

The touch panel 10 can be disposed on a display device. The display device can be a monochrome display, color graphics adapter (CGA) display, enhanced graphics adapter (EGA) display, variable-graphics-array (VGA) display, super VGA display, liquid crystal display (LCD), cathode ray tube (CRT), plasma displays and the like. The display device with the touch panel 10 thereon is operatively coupled to the processor and may be a separated component (peripheral device) or be integrated with the processor and program storage to form a desktop computer (all in one machine), a laptop, handheld or tablet or the like.

Figure 9:
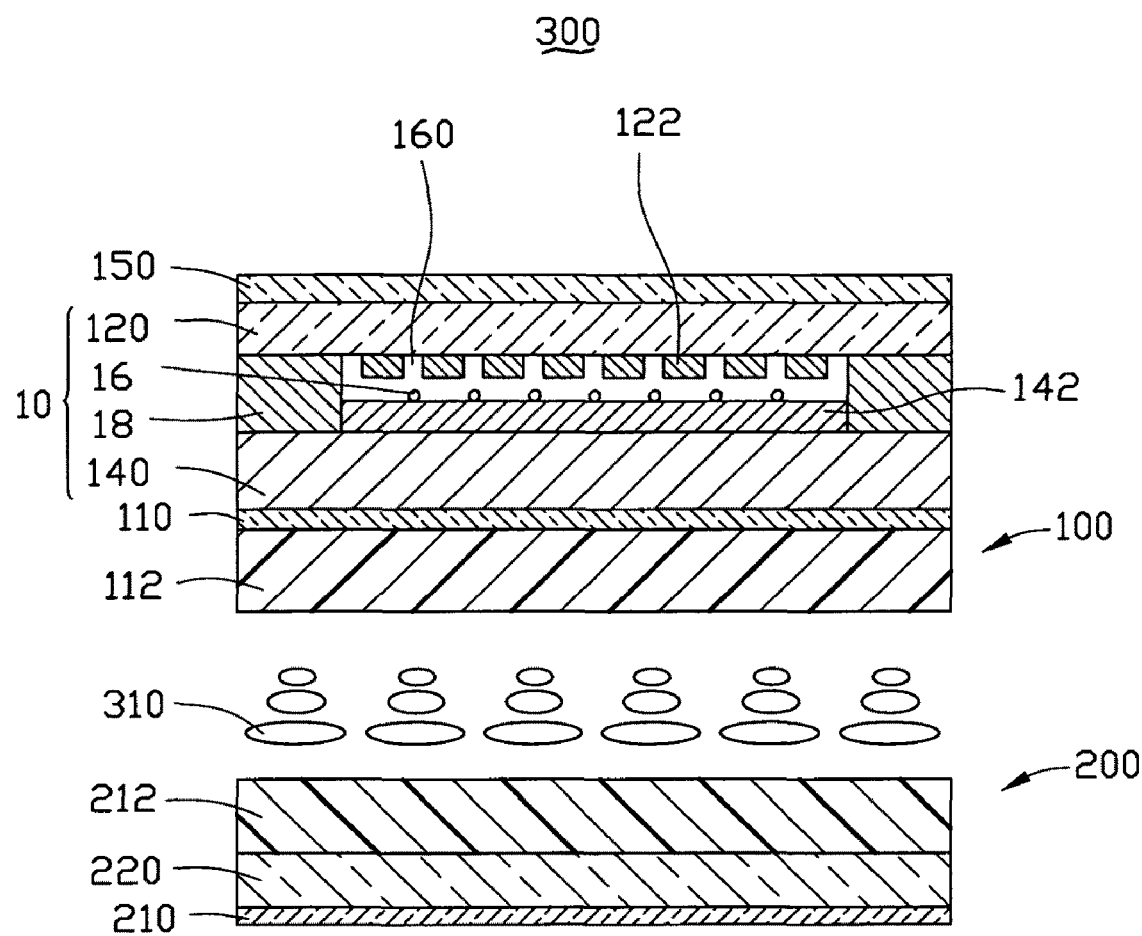
FIG. 9 is a cross sectional view of a liquid crystal display device using the touch panel in FIG. 3.

Referring to the embodiment of FIG. 9, a liquid crystal display screen 300 using the above mentioned touch panel 10 is disclosed. The liquid crystal display screen 300 includes an upper board 100, a lower board 200 opposite to the upper board 100, and a liquid crystal layer 310 located between the upper board 100 and the lower board 200.

A thickness of the liquid crystal layer 310 can be about 1 micron to about 50 microns. In one embodiment, the thickness of the liquid crystal layer 310 is about 5 microns. The liquid crystal layer 310 includes a plurality of cigar shaped liquid crystal molecules. Understandably, the liquid crystal layer 310 can also be made of other suitable materials. The liquid crystal molecules can vary aligned directions thereof under different electrical fields.

The upper board 100 from top to bottom includes the touch panel 10, a first polarizing layer 110, and a first alignment layer 112. The first polarizing layer 110 is disposed directly on the lower surface of the second substrate 140 of the touch panel 10. The first alignment layer 112 is disposed on the lower surface of the first polarizing layer 110. A lower surface of the first alignment layer 112 is adjacent to the liquid crystal layer 310. The lower surface of the first alignment layer 112 can further define a plurality of parallel straight first grooves (not shown). The first grooves are configured to align the orientation of the liquid crystal molecules.

The first polarizing layer 110 can be made of dichroic/dichromatic material. One typical type of dichroic polarizing layer 110 is made by incorporating a dye into a polymer matrix, which is stretched in at least one direction. The diebroic polarizers can also be made by uniaxially stretching a polymer matrix and staining the matrix with a dichroic dye. Alternatively, a polymer matrix can be stained with an oriented dichroic dye. The dichroic dyes generally include anthraquinone and azo dyes, as well as iodine.

In other embodiments, the first polarizing layer 110 can be made of at least one drawn carbon nanotube film. The drawn carbon nanotube films are aligned along a same direction. The carbon nanotubes in the first polarizing layer 110 are substantially aligned along the same direction. The carbon nanotubes have uniform absorption ability in the entire electromagnetic wavelength region, thus the first polarizing layer 110 made of drawn carbon nanotube film has a uniform polarization property in the entire electromagnetic wavelength region. When light beams are transmitted into a front side of the first polarizing layer 110, the light beams having a polarization parallel to the carbon nanotubes are absorbed by the carbon nanotubes, and the light beams having a polarization normal to the carbon nanotubes are transmitted through the first polarizing layer 110. Accordingly, the polarized light beams are transmitted through the first polarizing layer 110. The thickness of the first polarizing layer 110 can be ranged from about 1 micron to 0.5 millimeters.

Further, it is to be understood that in the liquid crystal display screen 300, an upper electrode (not shown) is needed to cooperate with a lower electrode (i.e., the pixel electrode) to apply a voltage on the liquid crystal layer located between the upper electrode and the lower electrode. In one embodiment, the upper electrode is disposed between the first alignment layer 112 and the first polarizing layer 110. The first polarizing layer 110 can be the drawn carbon nanotube film. Therefore, in another embodiment, the first polarizing layer 110 made by the drawn carbon nanotube film and can be used as the upper electrode in the liquid crystal display screen 300. Thus the first polarizing layer 110, made by the drawn carbon nanotube film, functions as the upper electrode as well as polarizing layer. In this situation, the upper electrode is needless. The resulting liquid crystal display screen 300 is thinner and requires fewer elements, but retains the same function.

The material of the first alignment layer 112 can be selected from a group consisting of polystyrene and its derivatives, polyimide, polyvinyl alcohol, polyester, epoxy resin, polyurethane, polysilane, and other suitable materials. The first grooves can be made by a scratching method, a SiOx-depositing method, or a micro grooves treating method. In one embodiment, the first alignment layer 112 is made of polyurethane and has a thickness of about 1 micron to about 50 microns.

It is to be understood that, in the drawn carbon nanotube film, the carbon nanotubes are aligned along the same direction and a groove can be formed by two adjacent carbon nanotubes. Thus, in another embodiment, the first polarizing layer 110 made of drawn carbon nanotube film and can serve as the first alignment layer 112 as well. In other embodiments, the drawn carbon nanotube film is used as the alignment layer 112, while still employing a first polarizing layer 110. The drawn carbon nanotube films are aligned along a same direction, and the carbon nanotubes in the first alignment layer 112 are aligned substantially along the same direction.

The lower board 200 from top to bottom includes a second alignment layer 212, a thin film transistor panel 220, and a second polarizing layer 210. The second alignment layer 212 is disposed on an upper surface of the thin film transistor panel 220 and adjacent to the liquid crystal layer 310. The second polarizing layer 210 is disposed on a lower surface of the thin film transistor panel 220. The second alignment layer 212 can further include a plurality of parallel straight second grooves. A length direction of the first grooves is perpendicular to a length direction of the second grooves.

The second polarizing layer 210 can be made of dichroic/dichromatic material or the drawn carbon nanotube film as the above-described first polarizing layer 110. The thickness of the second polarizing layer 210 can be ranged from about 1 micron to 0.5 millimeters. The second polarizing layer 210 is for polarizing the light emitted from a back-light unit disposed under the liquid crystal display screen 300, and achieving a polarized light. A polarizing direction of the second polarizing layer 210 is perpendicular to a polarizing direction of the first polarizing layer 110. When the second polarizing layer 210 includes at least one layer of the drawn carbon nanotube film, the carbon nanotubes in the second polarizing layer 210 are substantially aligned along a same direction and perpendicular to the carbon nanotubes in the first polarizing layer 110.

The material of the second alignment layer 212 can be selected from a group consisting of polystyrene and its derivatives, polyimide, polyvinyl alcohol, polyester, epoxy resin, polyurethane, polysilane, and other suitable materials. In one embodiment, the second alignment layer 212 is made of polyurethane and has a thickness of about 1 micron to about 50 microns. In other embodiments, the second alignment layer 212 can include at least one layer of the drawn carbon nanotube film as the described herein. The drawn carbon nanotube films are aligned along a same direction, and the carbon nanotubes in the second alignment layer 212 are aligned substantially along the same direction. When the first and second alignment layers 112, 212 both include the drawn carbon nanotube film, the carbon nanotubes in the first alignment layer 112 are perpendicular to the carbon nanotubes in the second alignment layer 212.

In one embodiment, the aligned direction of the carbon nanotubes in the first alignment layer 112 is the same with the aligned direction of the carbon nanotubes in the first polarizing layer 110, and is defined as the third direction. The aligned direction of the carbon nanotubes in the second alignment layer 212 is the same with the aligned direction of the carbon nanotubes in the second polarizing layer 210, and is defined as the fourth direction. The third direction is perpendicular to the fourth direction.

Due to the length direction of the first grooves on the first alignment layer 112 being perpendicular to the length direction of the second grooves on the second alignment layer 212, the aligned direction of the liquid crystal molecules are turned 90 degrees from the first alignment layer 112 to the second alignment layer 212.

Figure 10:
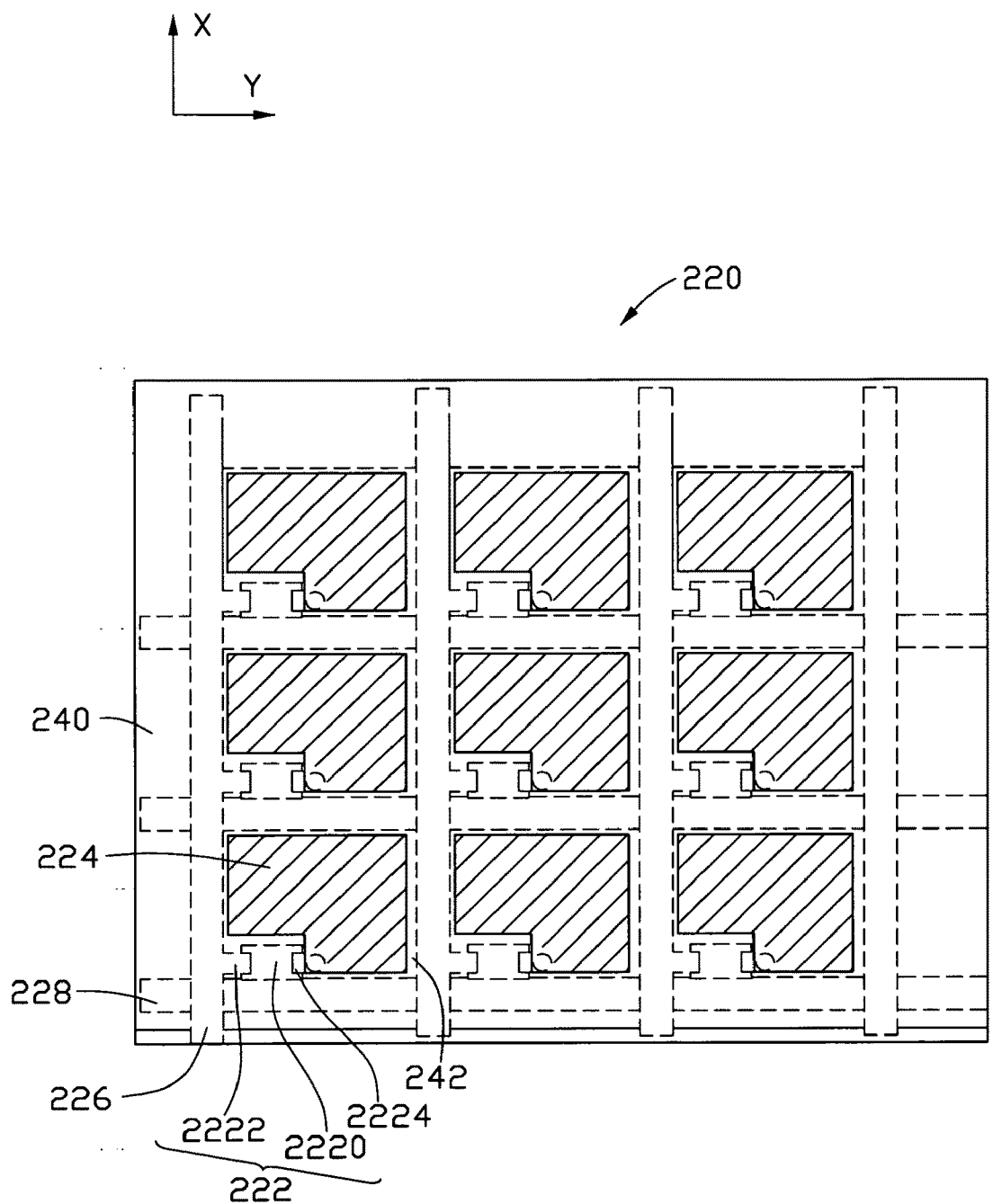
FIG. 10 is a top view of a thin film transistor panel in the liquid crystal display screen of FIG. 9.

Referring to the embodiment shown in FIG. 10, the thin film transistor panel 220 includes a third substrate 240, a plurality of thin film transistors 222, a plurality of pixel electrodes 224, a plurality of source lines 226, and a plurality of gate lines 228.

The thin film transistors 222, pixel electrodes 224, source lines 226, and gate lines 228 are disposed on a same surface (upper surface) of the third substrate 240. The source lines 226 are spaced from each other and can be arranged parallel along X direction. The gate lines 228 are spaced from each other and can be arranged parallel along Y direction. The Y direction is perpendicular to the X direction. Thus, the surface of the insulating substrate 240 is divided into a matrix of grid regions 242. The pixel electrodes 224 and the thin film transistors 222 are separately disposed in the grid regions 242. The pixel electrodes 224 are spaced from each other. The thin film transistors 222 are spaced from each other. Each grid region 242 contains one thin film transistor 222 and one pixel electrode 224 stacked or spaced apart from each other. Here, in each grid region 242, the pixel electrode 224 covers the thin film transistor 222.

Figure 11:
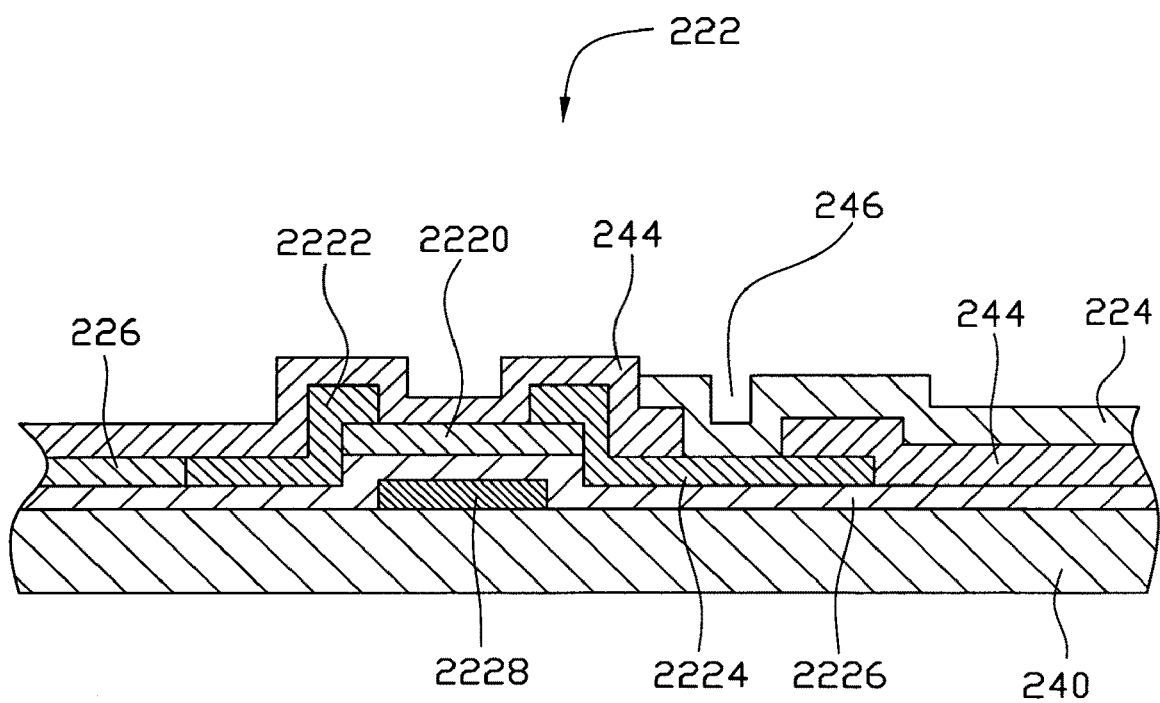
FIG. 11 is a cross sectional view of a thin film transistor in the thin film transistor panel of FIG. 10.

Referring to FIG. 11, the thin film transistor 222, according to one embodiment, includes a semiconducting layer 2220, a source electrode 2222, a drain electrode 2224, an insulating layer 2226, and a gate electrode 2228.

The pixel electrode 224 is electrically connected with the drain electrode 2224 of the thin film transistor 222. More specifically, a pixel insulating layer 244 can be further disposed on the thin film transistor 222. The pixel insulating layer 244 covers the thin film transistor 222 and defines a through hole 246 to expose the drain electrode 2224 of the thin film transistor 222. The pixel electrode 224 covers the entire grid region 242 and the thin film transistor 222 therein, and electrically connects to the drain electrode 2224 at the through hole 246. Other part of the thin film transistor 222 except the drain electrode 2224 is insulated from the pixel electrode 224 by the pixel insulating layer 244. The material of the pixel insulating layer 244 can be a rigid material such as silicon nitride ($Si_3N_4$) or silicon dioxide ($SiO_2$), or a flexible material such as polyethylene terephthalate (PET), benzocyclobutenes (BCB), or acrylic resins.

Each source electrode 2222 of the thin film transistor 222 is electrically connected with one source line 226. More specifically, the source electrodes 2222 of each line of the thin film transistors 222 are electrically connected with one source line 226 near the thin film transistors 222. Each gate electrode 2228 of the thin film transistor 222 is electrically connected with one gate line 228. The gate electrodes 2228 of each line of the thin film transistors 222 are electrically connected with one gate line 228 near the thin film transistors 222.

The thin film transistor panel 220 can further include a drive circuit (not shown). The source lines 226 and gate lines 228 are connected to the drive circuit. The drive circuit controls the on and off of the thin film transistors 222 through the source lines 226 and gate lines 228. The drive circuit can be mounted on the third substrate 240.

The third substrate 240 is provided for supporting the thin film transistor 222. The material of the third substrate 240 can be the same as a substrate of a printed circuit board (PCB), and can be selected from rigid materials (e.g., p-type or n-type silicon, silicon with an silicon dioxide layer formed thereon, glass, crystal, crystal with a oxide layer formed thereon), or flexible materials (e.g., plastic or resin). In one embodiment, the material of the insulating substrate is PET.

The pixel electrodes 224 are transparent conductive films made of a conductive material. When the pixel electrodes 224 is used in the liquid crystal displays, the materials of the pixel electrodes 224 can be selected from the group consisting of indium tin oxide (ITO), antimony tin oxide (ATO), indium zinc oxide (IZO), conductive polymer, and metallic carbon nanotubes. An area of each pixel electrode 224 can be in a range from about 10 square micrometers to 0.1 square millimeters. In one embodiment, the material of the pixel electrode 224 is ITO, the area of each pixel electrode 224 is about 0.05 square millimeters.

The materials of the source lines 226 and the drain lines 140 are conductive, and can be selected from the group consisting of metal, alloy, silver paste, conductive polymer, or metallic carbon nanotube wires. The metal or alloy can be selected from the group consisting of aluminum (Al), copper (Cu), tungsten (W), molybdenum (Mo), gold (Au), titanium (Ti), neodymium (Nd), palladium (Pd), cesium (Cs), and combinations thereof. A width of the source lines 226 and the gate lines 228 can be in the range from about 0.5 nanometers to about 100 micrometers. Here, the material of the source lines 226 and the gate lines 228 is Al, the width of the source lines 226 and the gate lines 228 is about 10 micrometers.

The thin film transistor 222 can be a top gate structure or a bottom gate structure. Referring to the embodiment shown in FIG. 11, the thin film transistor 222 is a bottom gate structure. The gate electrode 2228 is disposed on the upper surface of the third substrate 240. The insulating layer 2226 covers the gate electrode 2228. The semiconducting layer 2220 is disposed on the insulating layer 2226, and insulated from the gate electrode 2228 by the insulating layer 2226. The source electrode 2222 and the drain electrode 2224 are spaced apart from each other and electrically connected to the semiconducting layer 2220. The source electrode 2222, and the drain electrode 2224 are insulated from the gate electrode 2228 by the insulating layer 2226.

The semiconducting layer 2220 can be made of semiconducting material such as amorphous silicone (a-Si), polysilicone (p-Si), or organic semiconducting material. A length of the semiconducting layer 2220 is ranged from about 1 micron to 100 microns. A width of the semiconducting layer 2220 is ranged from about 1 micron to 1 millimeter. A thickness of the semiconducting layer 2220 is ranged from about 0.5 nanometers to 100 microns.

The semiconducting layer 2220 includes a semiconducting carbon nanotube structure. The semiconducting carbon nanotube structure includes a plurality of single-walled carbon nanotubes or double-walled carbon nanotubes having semiconducting carbon nanotubes. Diameters of the single-walled carbon nanotubes range from about 0.5 nanometers to about 50 nanometers. Diameters of the double-walled carbon nanotubes range from about 1 nanometer to about 50 nanometers. In one embodiment, the carbon nanotubes are single-walled carbon nanotubes with the diameters less than 10 nanometers.

Figure 12:
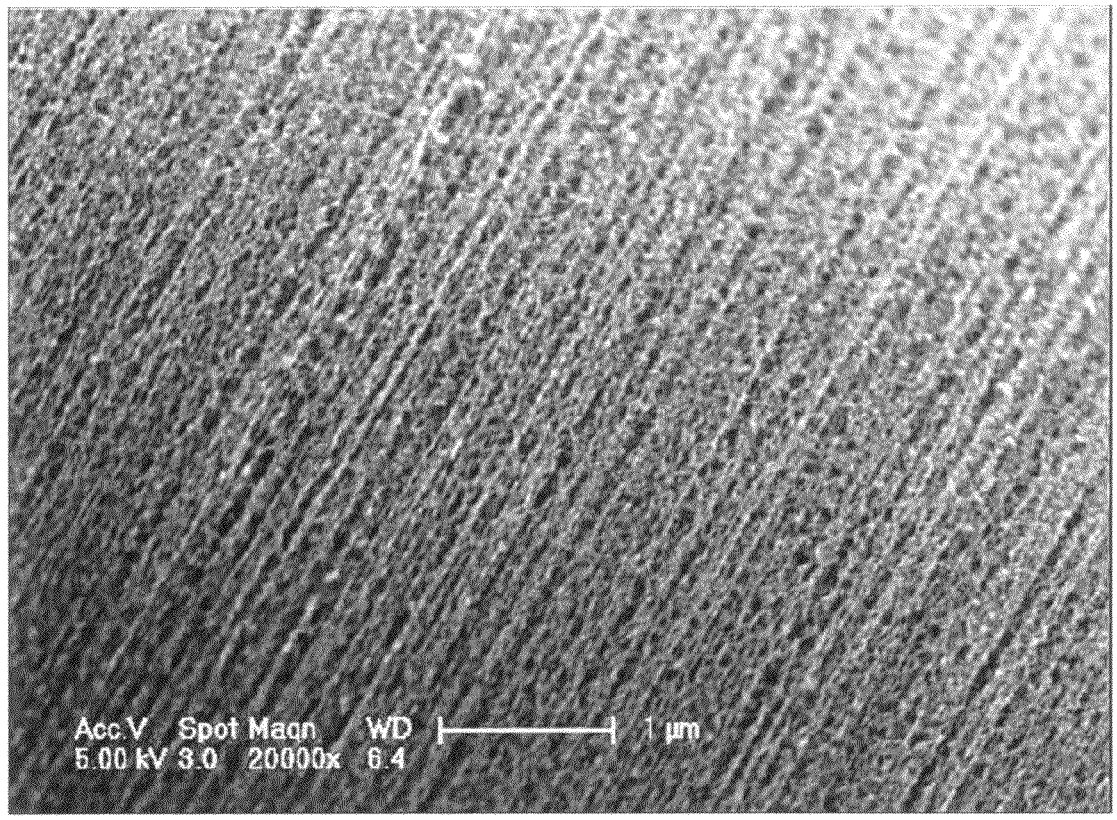
FIG. 12 shows a Scanning Electron Microscope (SEM) image of a carbon nanotube film used in the thin film transistor of FIG. 11.

More specifically, the semiconducting carbon nanotube structure can include the ordered carbon nanotube film or disordered carbon nanotube film as described above. In the embodiment shown in FIG. 12, the semiconducting carbon nanotube structure includes an ordered carbon nanotube film. Referring to FIG. 12, a carbon nanotube segment film includes a plurality of carbon nanotubes arranged along one orientation. The carbon nanotubes are parallel with each other, have almost equal length and are combined side by side by van der Waals attractive force therebetween. A length of the carbon nanotubes can reach up to several millimeters. The length of the carbon nanotube segment film can be equal to the length of all the carbon nanotubes, such that at least one carbon nanotube will span the entire length of the carbon nanotube segment film. The length of the carbon nanotube segment film is only limited by the length of the carbon nanotubes. The length of the carbon nanotubes can range from about 1 millimeter to about 10 millimeters.

In some embodiments, the ordered carbon nanotube segment film can be produced by growing a strip-shaped carbon nanotube array, and pushing (or pressing) the strip-shaped carbon nanotube array down along a direction perpendicular to length of the strip. The strip-shaped carbon nanotube array is grown from a substrate where a strip-shaped catalyst film is formed. The strip-shaped catalyst film has a relatively long length, and a relatively narrow width less than 20 micrometers. A height of the carbon nanotube array can range from about 1 millimeter to about 10 millimeters.

The strip-shaped carbon nanotube array can be pushed down by the action of an organic solvent. The trip-shaped carbon nanotube array can be immersed into the organic solvent; and elevated from the organic solvent along a direction perpendicular to the length of the strip. The strips of carbon nanotubes are forced down on the substrate because of the surface tension of the organic solvent to form the carbon nanotube segment film.

The strip-shaped carbon nanotube array can be pushed down by a mechanical force executed by a pressing device. The pressing device presses the strip-shaped carbon nanotube array along a direction parallel to perpendicular to the length of the strip. The pressing device can be, e.g., a pressure head with a glossy surface, such as a roller.

The strip-shaped carbon nanotube array can be pushed down by an air current blowing. The strip-shaped carbon nanotube array is blown down on the substrate along a direction parallel to perpendicular to the length of the strip. It is also understood that a carbon nanotube film can be made from many strip-shaped carbon nanotube arrays, aligned such that the length of the carbon nanotubes are less than the distance between adjacent strips. When the strips are pressed down, adjacent carbon nanotubes overlap.

In some embodiments, the carbon nanotube film can be produced by a method adopting a "kite-mechanism" and can have carbon nanotubes with a length of even above 10 centimeters. This is considered by some to be ultra-long carbon nanotubes. However, this method can be used to grow carbon nanotubes of many sizes. Specifically, the carbon nanotube film can be produced by a method includes the following steps. Firstly, a growing substrate with a catalyst layer located thereon is provided. Secondly, the growing substrate is placed adjacent to the insulating substrate in a chamber. Then the chamber is heated to a growth temperature for carbon nanotubes a protective gas therein, and is introduced a carbon source gas along a gas flow direction. After introducing the carbon source gas into the chamber, the carbon nanotubes starts to grow. One end (e.g., the root) of the carbon nanotubes is fixed on the growing substrate. The growing substrate is near an inlet of the introduced carbon source gas, the ultra-long carbon nanotubes float above the insulating substrate with the roots of the ultra-long carbon nanotubes still attached to the growing substrate. The length of the ultra-long carbon nanotubes depends on the growth conditions. After growth has been stopped, the ultra-long carbon nanotubes land on the insulating substrate. The carbon nanotubes are then separated from the growing substrate. Thus, a plurality of carbon nanotubes can be formed on the insulating substrate. This can be repeated many times so as to obtain many layers of carbon nanotubes on a single insulating substrate. The insulating substrate can be rotated after each cycle such that the adjacent layers may have an angle from 0 to less than or equal to 90 degrees.

It is to be understood that, to achieve the semiconducting layer 2220, the carbon nanotube segment film can be further treated by an additional step of eliminating the metallic carbon nanotubes therein. In one embodiment, the step can be performed by applying a voltage between the source electrode 2222 and the drain electrode 2224, to break down the metallic carbon nanotubes in the carbon nanotube segment layer connected therebetween, and thereby achieving a semiconducting layer 2220 free of metallic carbon nanotubes therein. The voltage is in a range from 1 to 1000 volts (V). In other embodiments, the step can be performed by irradiating the carbon nanotube segment layer with a hydrogen plasma, microwave, terahertz (THz), infrared (IR), ultraviolet (UV), or visible light (Vis), to break down the metallic carbon nanotubes in the carbon nanotube segment layer, and thereby achieving the semiconducting layer 2220 free of metallic carbon nanotubes therein.

Figure 13:
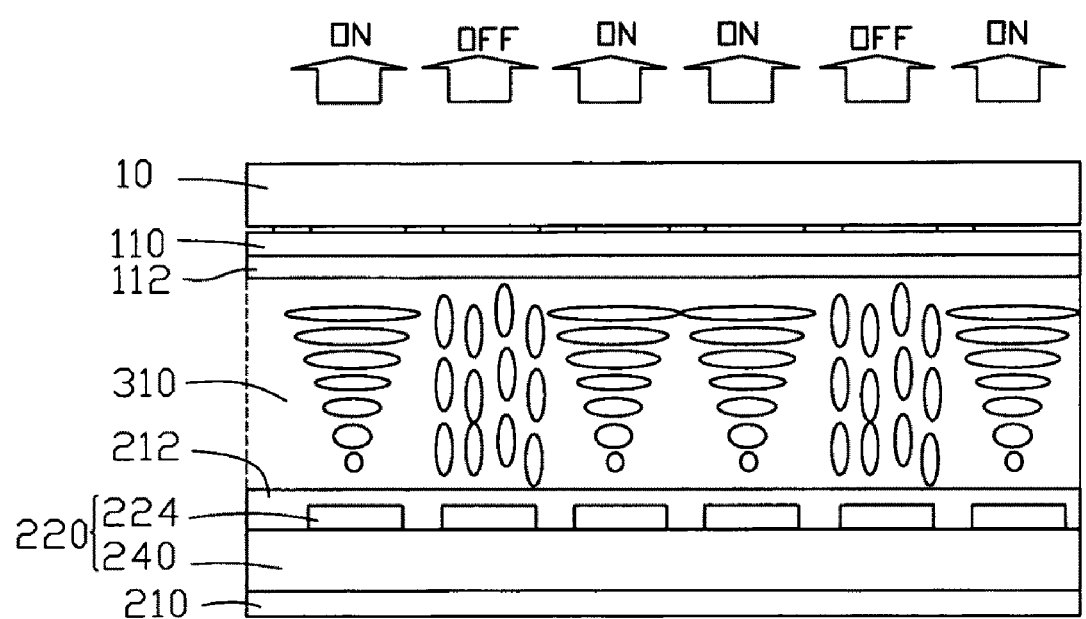
FIG. 13 is a schematic view of the lightening of the liquid crystal display screen of FIG. 9 during use.

The semiconducting layer 2220 can have a length of about 50 microns, a width of about 300 microns, and a thickness of about 5 nanometers. A channel is defined in the semiconducting layer 2220 between the source electrode 2222 and the drain electrode 2224. The channel can have a length of about 5 microns and a width of about 40 microns to 100 microns. In the semiconducting layer 2220, two ends of each carbon nanotubes are connected to the source electrode 2222 and the drain electrode 2224. The carrier mobility of the semiconducting carbon nanotubes along the length direction thereof is relatively high, and the carbon nanotubes in the semiconducting carbon nanotube structure are aligned substantially from the source electrode 2222 to the drain electrode 2224. Therefore, the travel path of the carriers in the semiconducting layer 2220 is minimal, and the carrier mobility of the thin film transistor 222 is relatively high Referring to FIGS. 10 and 13, in use, the drive circuit applies a scanning voltage to the source lines 226, and applies a controlling voltage on the gate lines 228. The source electrode 2222 and the drain electrode 2224 are electrically connected, and a voltage is applied on the pixel electrode 224 connected to the drain electrode 2224. When the voltage is applied on the pixel electrode 224, the electric field between the pixel electrode 224 and the first polarizing layer 110 comprising the drawn carbon nanotube film forces the liquid crystal molecules to align vertically, and thus the light polarized by the second polarizing layer 210 goes through the liquid crystal layer 310 without being twisted, and is stopped by the first polarizing layer 110. When the voltage is not applied on the pixel electrode 224, the light polarized by the second polarizing layer 210 is twisted by the liquid crystal molecules and can emit through the first polarizing layer 110.

Figure 14:
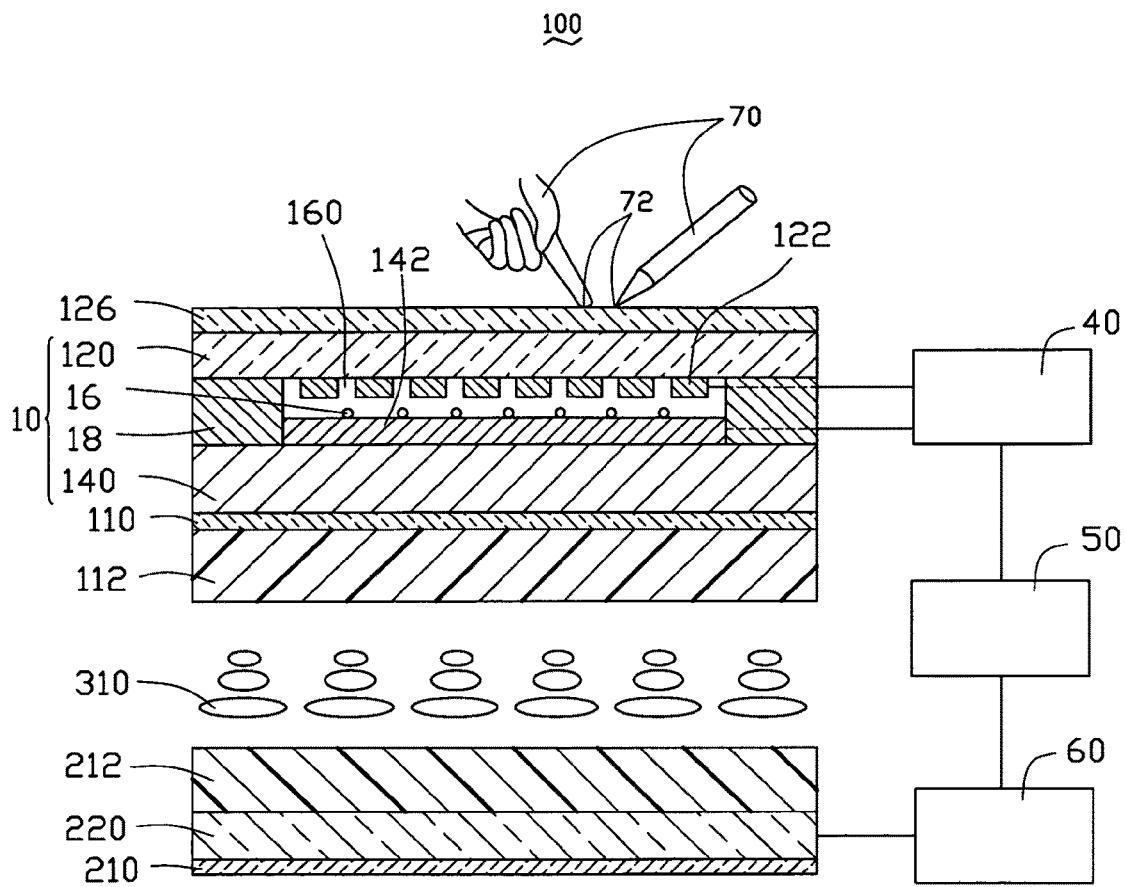
FIG. 14 is a schematic view of the liquid crystal display screen of FIG. 9 during use.

Referring to FIG. 14, the liquid crystal display screen 300 can further include a first controller 40, a central processing unit (CPU) 50, and a second controller 60. The touch panel 10 is connected to the first controller 40 by an external circuit. The first controller 40, the CPU 50, and the second controller 60 are electrically connected. The drive circuit of the thin film transistor panel 220 is electrically connected to the second controller 60.

A user operates the display by pressing the first electrode plate 12 of the touch panel 10 with a finger, a pen 60, or the like while visually observing the displaying of the liquid crystal display screen 300 through the touch panel 10. This pressing causes a deformation of the first electrode plate 12 at a pressed position 70. As discussed above the multi touch panel 10 can receive single or multiple coordinates of areas being touched. These X and Y coordinate(s) are received by the first controller 40.

Changes in voltages in the first direction of the first conductive layer 142 and the second direction of the second transparent electrode 142 can be detected by the first controller 40. Then, the first controller 40 transforms the changes in voltages into coordinates of the pressing position and sends the coordinates to the CPU 50. The CPU 50 then sends out commands according to the coordinates of the pressing position and controls the working of the thin film transistor panel 220 by the second controller 60.

The liquid crystal display screen 300 can be used in electronic apparatuses, such as personal computer systems (e.g., desktops, laptops, tablets or handhelds). The electronic apparatuses may also correspond to public computer systems such as information kiosks, automated teller machines (ATM), point of sale machines (POS), industrial machines, gaming machines, arcade machines, vending machines, airline e-ticket terminals, restaurant reservation terminals, customer service stations, library terminals, learning devices, and the like. The CPU of the electronic apparatuses and the CPU 50 of the liquid crystal display screen 300 can be integrated.

Further, to keep the distance from the upper board 100 to the lower board 200, a plurality of spacers (not shown) can be disposed between the upper board 100 and the lower board 200. In one embodiment, a diameter of the spacers is in the range from about 1 micron to about 10 microns.

It is to be understood that the liquid crystal display screen 300 can further include other elements such as color filters, black matrix, backlight unit, TFT driving circuit unit, and so on. The color filters are disposed below the first polarizing layer 110 for providing different color of lights. The black matrix is formed on the lower surface of the second substrate 140. The backlight unit is disposed below the second polarizing layer 210 for providing light. The TFT driving circuit unit is connected to the TFTs for driving the TFT panel 220. The black matrix may be located on the lower surface of the second substrate 140 in a matrix arrangement. The black matrix may divide the surface of the second substrate 140 into a plurality of cell areas where the color filters are to be formed and to prevent light interference between adjacent cells. The color filter may include red, green, and blue tricolors.

The touch panel 10, liquid crystal display screen 300 using the same, and the methods for making the same in the embodiments can have the following superior properties. The touch panel 10 adopting the plurality of the first and second transparent electrodes 122, 142 can sense a plurality touches or presses occurred at the same time. The properties of the carbon nanotubes provide superior toughness and high mechanical strength to the carbon nanotube film and further to the carbon nanotube structure. Thus, the touch panel 10 and the liquid crystal display screen 300 using the same adopting the carbon nanotube structure are durable and highly reliable. In embodiments employing the drawn carbon nanotube film is flexible, and suitable for using as the first and second transparent electrodes 122, 142 in a flexible touch panel 10. The pulling method for fabricating each drawn carbon nanotube film is simple, and the adhesive drawn carbon nanotube film can be laid on the substrates 120, 140, 240 directly. As such, the drawn carbon nanotube film is suitable for the mass production of touch panels 10 and liquid crystal display screen 300 using the same. The drawn carbon nanotube film has a high transparency, thereby improving brightness of the touch panel 10 and the liquid crystal display screen 300 using the same. The drawn carbon nanotube film has the properties of light polarizing and electrically conducting, and thus the drawn carbon nanotube film can be used as both the first polarizing layer 110 and the upper electrode in one structure. Accordingly, the resulting embodiments can have a simpler structure, thinner thickness, and higher brightness. In embodiments employing carbon nanotubes in the semiconducting layer 2220 of the thin film transistor 222, the flexibility of the thin film transistor 222 can be improved. To cooperate with other flexible material, the liquid crystal display screen 300 can also be made flexible. The semiconducting carbon nanotube structure is adhesive and can be easily adhered on a desired location at a low temperature (e.g., room temperature). Thus, the semiconducting carbon nanotube structure can be transfer-printed on the insulating layer 2226, and the thin film transistor 222 can be made at low temperature.

It is to be understood that there are two kinds of carbon nanotubes: metallic carbon nanotubes and semiconducting carbon nanotubes determined by the arrangement of the carbon atoms therein. The carbon nanotube structure or carbon nanoatube film may contain both kinds of the carbon nanotubes. In the present application, only in the semiconducting layers 2220, almost all or at least a large part of the carbon nanotubes are semiconducting carbon nanotubes. In other elements that including carbon nanotubes of the touch panel and the liquid crystal display screen, the majority of the carbon nanotubes are metallic carbon nanotubes.

It is to be understood that the above-described embodiments are intended to illustrate rather than limit the invention. Variations may be made to the embodiments without departing from the spirit of the invention as claimed. It is envisioned that any element from any embodiment can be used in conjunction with any other embodiment. The above-described embodiments illustrate the scope of the invention but do not restrict the scope of the invention.

It is also to be understood that above description and the claims drawn to a method may include some indication in reference to certain steps. However, the indication used is only to be viewed for identification purposes and not as a suggestion as to an order for the steps.

What is claimed is:

1. A liquid crystal display screen comprising:
    an upper board comprising a touch panel, the touch panel comprising a plurality of transparent electrodes, at least one of the plurality of transparent electrodes comprises a transparent carbon nanotube structure, the transparent carbon nanotube structure comprises metallic carbon nanotubes;
    a lower board comprising a thin film transistor panel, the thin film transistor panel comprising a plurality of thin film transistors, each of the plurality of thin film transistors comprises a semiconducting layer, the semiconducting layer comprises a semiconducting carbon nanotube structure, the semiconducting carbon nanotube structure comprises semiconducting carbon nanotubes, wherein at least one of the transparent carbon nanotube structure and the semiconducting carbon nanotube structure comprises an ordered carbon nanotube film, wherein the ordered carbon nanotube film comprises a plurality of carbon nanotubes aligned along a same direction; and
    a liquid crystal layer located between the upper board and the lower board.

2. The liquid crystal display screen of claim 1, wherein the plurality of carbon nanotubes are successive and commonly oriented and joined end to end by van der Waals attractive force.

3. The liquid crystal display screen of claim 1, wherein at least one of the transparent carbon nanotube structure and the semiconducting carbon nanotube structure comprises two or more stacked ordered carbon nanotube films and an angle between arranged directions of the carbon nanotubes in two adjacent stacked ordered carbon nanotube films is in a range from about 0° to about 90°.

4. The liquid crystal display screen of claim 1, wherein the ordered carbon nanotube film comprises a plurality of successively oriented carbon nanotube segments joined end to end by van der Waals attractive force therebetween, and each carbon nanotube segment comprises a plurality of carbon nanotubes that are combined by van der Waals attractive force therebetween.

5. The liquid crystal display screen of claim 1, wherein the transparent carbon nanotube structure is a composite structure comprising at least one ordered carbon nanotube film and a polymer material infiltrated in the at least one ordered carbon nanotube film.

6. The liquid crystal display screen of claim 1, wherein the plurality of transparent electrodes comprise a plurality of first transparent electrodes and a plurality of second transparent electrodes;
    the touch panel further comprises:
        a first electrode plate comprising:
            a first substrate,
            the plurality of first transparent electrodes, spaced from each other, disposed on the first substrate and aligned along a first direction, and
            a plurality of first signal wires, each of the first transparent electrodes is connected to one of the first signal wires;
        a second electrode plate, spaced from the first electrode plate, comprising:
            a second substrate,
            the plurality of second transparent electrodes, spaced from each other, disposed on the second substrate and aligned along a second direction, and
            a plurality of second signal wires, and each of the second transparent electrodes is connected to one of the second signal wires.

7. The liquid crystal display screen of claim 6, wherein the plurality of first transparent electrodes are substantially parallel to each other and uniformly spaced from each other, the plurality of second transparent electrodes are substantially parallel to each other and uniformly spaced from each other, and each of the first transparent electrodes and second transparent electrodes has a strip-shaped structure.

8. The liquid crystal display screen of claim 6, wherein a width of the transparent carbon nanotube structure is in a range from about 20 microns to about 250 microns.

9. The liquid crystal display screen of claim 6, wherein a distance between adjacent first transparent electrodes is in a range from about 20 microns to about 50 microns, a distance between adjacent second transparent electrodes is in a range from about 20 microns to about 50 microns.

10. The liquid crystal display screen of claim 6, wherein the carbon nanotubes in the first transparent electrodes are substantially arranged along the first direction, the carbon nanotubes in the second transparent electrodes are substantially arranged along the second direction.

11. The liquid crystal display screen of claim 6, wherein each of the plurality of first transparent electrodes comprises a first end and a second end;
    the first end of each of the plurality of first transparent electrodes is connected to an X-coordinate drive power source, the second end of each of the plurality of first transparent electrodes is connected to a sensor;
    each of the plurality of second transparent electrodes comprises a first end and a second end;
    the first end of each of the plurality of second transparent electrodes is connected to a Y-coordinate drive power source, the second end of each of the plurality of second transparent electrodes is grounded.

12. The liquid crystal display screen of claim 6, wherein the first signal wires and second signal wires comprise a material selected from the group consisting of indium tin oxide, antimony tin oxide, conductive resin, carbon nanotubes, and combinations thereof.

13. The liquid crystal display screen of claim 1, wherein the upper board further comprises a first polarizing layer and a first alignment layer.

14. The liquid crystal display screen of claim 1, wherein the thin film transistor panel further comprises:
    a third substrate;
    a plurality of parallel source lines;
    a plurality of parallel gate lines intersecting with the source lines; and a plurality of gird regions defined by the source lines and gate lines, each of the plurality of grid regions comprising:
  a pixel electrode; and
  one of the plurality of thin film transistors, each thin film transistor further comprising:
    a source electrode connected with one of the source lines defining the grid regions;
    a drain electrode that is spaced from the source electrode and connected with the pixel electrode;
    the semiconducting layer connected with the source electrode and the drain electrode; and
    a gate electrode connected with one of the gate lines defining the grid regions, and the gate electrode is insulated from the source electrode, the drain electrode, and the semiconducting layer by an insulating layer.

15. The liquid crystal display screen of claim 1, wherein the lower board further comprises a second alignment layer and a second polarizing layer.

16. The liquid crystal display screen of claim 13, wherein the first polarizing layer comprises a plurality of carbon nanotubes aligned approximately along a same direction.

17. The liquid crystal display screen of claim 15, wherein the second polarizing layer comprises a plurality of carbon nanotubes aligned approximately along a same direction.

18. The liquid crystal display screen of claim 1, wherein the upper board further comprises a first polarizing layer and a first alignment layer; the lower board further comprises a second alignment layer and a second polarizing layer; wherein the first polarizing layer and the second polarizing layer both comprise a plurality of carbon nanotubes aligned approximately along a same direction, the carbon nanotubes in the first polarizing layer are substantially perpendicular to the carbon nanotubes in the second polarizing layer.

19. The liquid crystal display screen of claim 1, wherein the upper board further comprises a carbon nanotube layer configured for both polarizing light and aligning liquid crystals, wherein the carbon nanotube layer comprises a plurality of carbon nanotubes substantially arranged along a direction.

20. A liquid crystal display screen comprising:
  an upper board comprising a touch panel, the touch panel comprising a plurality of transparent electrodes, at least one of the plurality of transparent electrodes comprising a transparent carbon nanotube structure, the transparent carbon nanotube structure comprising a plurality of carbon nanotubes oriented substantially along a same direction;
  a lower board comprising a thin film transistor panel, the thin film transistor panel comprising a plurality of thin film transistors, each of the plurality of thin film transistors comprising a semiconducting layer, the semiconducting layer comprising a semiconducting carbon nanotube structure, the semiconducting carbon nanotube structure comprising a plurality of semiconducting carbon nanotubes; and
  a liquid crystal layer located between the upper board and the lower board.

21. A liquid crystal display screen comprising:
  an upper board comprising a resistance-type touch panel, the resistance-type touch panel comprising:
    a first electrode plate comprising:
      a first substrate,
      a plurality of first transparent electrodes located on the first substrate, spaced from each other, and aligned along a first direction, and
      a plurality of first signal wires, each of the first transparent electrodes being connected to one of the first signal wires;
    a second electrode plate, spaced from the first electrode plate, comprising:
      a second substrate,
      a plurality of second transparent electrodes located on the second substrate, spaced from each other, and aligned along a second direction, both the second transparent electrodes and the first transparent electrodes comprising a transparent carbon nanotube structure, the transparent carbon nanotube structure comprising a plurality of carbon nanotube oriented substantially along a same direction, and
      a plurality of second signal wires, each of the second transparent electrodes being connected to one of the second signal wires; and
  a lower board comprising:
    a thin film transistor panel, the thin film transistor panel comprising:
      a plurality of thin film transistors, each of the plurality of thin film transistors comprising a semiconducting layer, the semiconducting layer comprising a semiconducting carbon nanotube structure, the semiconducting carbon nanotube structure comprising a plurality of semiconducting carbon nanotubes; and
  a liquid crystal layer located between the upper board and the lower board;
  wherein the first transparent electrodes contact the second transparent electrodes at a position where pressing occurs.

* * * * *